(12) United States Patent
Lyons et al.

(10) Patent No.: US 6,653,641 B2
(45) Date of Patent: Nov. 25, 2003

(54) BULK MATERIAL IRRADIATION SYSTEM AND METHOD

(75) Inventors: Stan V. Lyons, Brentwood, CA (US); Steven E. Koenck, Cedar Rapids, IA (US); Brian T. Dalziel, Marion, IA (US); Douglas C. White, Cedar Rapids, IA (US); Janette J. Kewley, Marion, IA (US)

(73) Assignee: Mitec Incorporated, Cedar Rapids, IA (US)

( * ) Notice: Subject to any disclaimer, the term of this patent is extended or adjusted under 35 U.S.C. 154(b) by 223 days.

(21) Appl. No.: 09/795,058

(22) Filed: Feb. 26, 2001

(65) Prior Publication Data

US 2001/0042841 A1 Nov. 22, 2001

Related U.S. Application Data

(60) Provisional application No. 60/184,794, filed on Feb. 24, 2000, provisional application No. 60/192,872, filed on Mar. 29, 2000, provisional application No. 60/208,700, filed on Jun. 1, 2000, provisional application No. 60/214,697, filed on Jun. 27, 2000, and provisional application No. 60/246,467, filed on Nov. 7, 2000.

(51) Int. Cl.[7] .............................................. G12B 21/02
(52) U.S. Cl. .................................. 250/492.2; 250/492.3
(58) Field of Search ............................. 250/492.3, 394, 250/453.1, 337, 305, 434, 492.2

(56) References Cited

U.S. PATENT DOCUMENTS

| | | | |
|---|---|---|---|
| 924,284 A | 6/1909 | Smith | |
| 1,809,078 A | 6/1931 | Smith | |
| 2,095,502 A | 10/1937 | Johnston | 21/54 |
| 2,456,909 A | 12/1948 | Brasch | 21/54 |
| 2,602,751 A | 7/1952 | Robinson | 99/221 |
| 2,741,704 A | 4/1956 | Trump et al. | 250/49.5 |
| 2,816,231 A | 12/1957 | Nygard | 250/43 |
| 2,824,969 A | 2/1958 | Crowley-Milling | 250/49.5 |
| 2,963,369 A | 12/1960 | Urbain | 99/107 |
| 2,989,735 A | 6/1961 | Gumpertz | 340/174.1 |
| 3,087,598 A | 4/1963 | Clore | 198/38 |
| 3,224,562 A | 12/1965 | Bailey et al. | 198/131 |
| 3,261,140 A | 7/1966 | Long et al. | 53/22 |
| 3,396,273 A | 8/1968 | Brunner | 250/52 |
| 3,452,195 A | 6/1969 | Brunner | 250/52 |
| 3,560,745 A | 2/1971 | Petersen et al. | 250/83 |
| 3,564,241 A | 2/1971 | Ludwig | 250/52 |
| 3,567,462 A | 3/1971 | Silverman et al. | 99/157 |
| 3,676,673 A | 7/1972 | Coleman | 250/49.5 |
| 3,676,675 A | 7/1972 | Ransohoff et al. | 250/52 |
| 3,780,305 A | 12/1973 | Free | 250/400 |
| 3,876,373 A | 4/1975 | Glyptis | 21/54 |
| 3,974,391 A | 8/1976 | Offermann | 250/492 |
| 4,013,261 A | 3/1977 | Steigerwald et al. | 250/453 |
| 4,066,907 A | 1/1978 | Tetzlaff | 250/453 |
| 4,151,419 A | 4/1979 | Morris et al. | 250/453 |
| 4,201,920 A | 5/1980 | Tronc et al. | 250/492 |
| 4,281,251 A | 7/1981 | Thompson et al. | 250/398 |
| 4,484,341 A | 11/1984 | Luniewski | 378/69 |
| 4,652,763 A | 3/1987 | Nablo | 250/492.3 |
| 4,663,532 A | 5/1987 | Roche | 250/400 |
| 4,757,201 A * | 7/1988 | Kanter | 250/337 |
| 4,760,264 A | 7/1988 | Barrett | 250/453.1 |
| 4,767,930 A | 8/1988 | Stieber et al. | 250/396 |
| 4,785,178 A | 11/1988 | Lynch et al. | 250/496.1 |

(List continued on next page.)

Primary Examiner—Bruce Anderson
Assistant Examiner—Phillip A Johnston
(74) Attorney, Agent, or Firm—Kinney & Lange, P.A.

(57) ABSTRACT

A bulk material irradiation system includes an input for inserting bulk material. A bulk material tube is connected to the input, forming a path for bulk material flow. A pressurizing assembly is connected to the bulk material tube for forcing the bulk material to flow through the bulk material tube. An irradiation assembly provides ionizing radiation to irradiate the bulk material passing adjacent to the irradiation assembly in the bulk material tube. Irradiated bulk material exits the bulk material tube through an output.

22 Claims, 18 Drawing Sheets

U.S. PATENT DOCUMENTS

| | | | | |
|---|---|---|---|---|
| 4,788,126 | A | 11/1988 | Feldman et al. | 430/138 |
| 4,788,701 | A | 11/1988 | Barrett | 378/69 |
| 4,852,138 | A | 7/1989 | Bergeret et al. | 378/69 |
| 4,864,595 | A | 9/1989 | Barrett | 378/69 |
| 4,866,281 | A | 9/1989 | Bosshard | 250/453.1 |
| 4,870,368 | A | 9/1989 | Putnam | 328/233 |
| 4,908,221 | A | 3/1990 | Barrett | 426/240 |
| 4,974,503 | A | 12/1990 | Koch | 99/451 |
| 5,004,926 | A | 4/1991 | Vassenaix et al. | 250/492.3 |
| 5,008,550 | A | 4/1991 | Barrett | 250/453.1 |
| 5,026,983 | A | 6/1991 | Meyn | 250/233 R |
| 5,096,553 | A | 3/1992 | Ross et al. | 204/157.15 |
| 5,101,168 | A | 3/1992 | Miller | 328/233 |
| 5,323,442 | A | 6/1994 | Golovanivsky et al. | 378/119 |
| 5,362,442 | A | 11/1994 | Kent | 422/22 |
| 5,366,746 | A | 11/1994 | Mendenhall | 426/521 |
| 5,396,071 | A | 3/1995 | Atwell et al. | 250/358.1 |
| 5,396,074 | A | 3/1995 | Peck et al. | 250/453.11 |
| 5,400,382 | A | 3/1995 | Welt et al. | 378/69 |
| 5,434,421 | A * | 7/1995 | Burth et al. | 250/434 |
| 5,451,790 | A | 9/1995 | Enge | 250/436 |
| 5,461,656 | A | 10/1995 | Golovanivsky et al. | 378/66 |
| 5,470,597 | A | 11/1995 | Mendenhall | 426/521 |
| 5,482,726 | A | 1/1996 | Robinson, Jr. | 426/238 |
| 5,530,255 | A * | 6/1996 | Lyons et al. | 250/492.3 |
| 5,554,856 | A | 9/1996 | Bidnyy et al. | 250/455 |
| 5,557,109 | A | 9/1996 | Bidnyy et al. | 250/455 |
| 5,590,602 | A | 1/1997 | Peck et al. | 104/88.01 |
| 5,593,713 | A | 1/1997 | De La Luz-Martinez et al. | 426/237 |
| 5,597,597 | A | 1/1997 | Newman | 426/248 |
| 5,603,972 | A | 2/1997 | McFarland | 426/240 |
| 5,635,714 | A | 6/1997 | Nablo et al. | 250/305 |
| 5,661,305 | A | 8/1997 | Lawrence et al. | 250/397 |
| 5,690,978 | A | 11/1997 | Yin et al. | 426/237 |
| 5,801,387 | A | 9/1998 | Nablo et al. | 250/492.3 |
| 5,825,037 | A * | 10/1998 | Nablo | 250/492.3 |
| 5,834,744 | A | 11/1998 | Risman | 219/697 |
| 5,838,760 | A | 11/1998 | Moses | 378/119 |
| 5,847,401 | A * | 12/1998 | McKeown et al. | 250/396 |
| 5,881,534 | A | 3/1999 | Ahlqvist et al. | 53/403 |
| 5,966,457 | A | 10/1999 | Lemelson | 382/141 |
| 5,994,706 | A | 11/1999 | Allen et al. | 250/454.11 |
| 6,023,497 | A | 2/2000 | Takahashi et al. | 378/57 |
| 6,027,754 | A | 2/2000 | Bushnell et al. | 426/238 |
| 6,051,185 | A | 4/2000 | Beers | 422/22 |
| 6,066,348 | A | 5/2000 | Yuan et al. | 426/236 |
| 6,086,932 | A | 7/2000 | Gupta | 426/237 |
| 6,096,379 | A | 8/2000 | Eckhoff | 427/428 |
| 6,127,687 | A | 10/2000 | Williams et al. | 250/492.3 |
| 6,232,610 | B1 | 5/2001 | Pageau et al. | 250/474.1 |
| 6,429,444 | B1 * | 8/2002 | Korenev et al. | 250/492.3 |
| 6,437,344 | B1 * | 8/2002 | Strawson | 250/455.11 |
| 6,492,645 | B1 * | 12/2002 | Allen et al. | 250/453.11 |

* cited by examiner

BULK MATERIAL IRRADIATION SYSTEM AND METHOD

CROSS-REFERENCE TO RELATED APPLICATION(S)

This application claims the benefit of Provisional Application No. 60/184,794 filed Feb. 24, 2000 for "Material Handling System And Method For Irradiation" by S. Lyons and S. Koenck, and also claims the benefit of Provisional Application No. 60/192,872 filed Mar. 29, 2000 for "Irradiation Control And Calibration System And Method" by S. Lyons, S. Koenck, B. Dalziel, D. White and J. Kewley, and also claims the benefit of Provisional Application No. 60/208,700 filed Jun. 1, 2000 for "Bulk Material Irradiation System And Method" by S. Lyons, S. Koenck, B. Dalziel, D. White and J. Kewley, and also claims the benefit of Provisional Application No. 60/214,697 filed Jun. 27, 2000 for "Bulk Material Irradiation Exposure Compensation System And Method" by S. Lyons, S. Koenck, B. Dalziel, D. White and J. Kewley, and also claims the benefit of Provisional Application No. 60/246,467 filed Nov. 7, 2000 for "Bulk Material Irradiation Exposure Compensation System And Method" by S. Lyons, S. Koenck, B. Dalziel, D. White and J. Kewley.

INCORPORATION BY REFERENCE

The aforementioned Provisional Application Nos. 60/184,794, 60/192,872, 60/208,700, 60/214,697 and 60/246,467 are hereby incorporated by reference in their entirety.

BACKGROUND OF THE INVENTION

The present invention relates to a bulk material irradiation system and method, and more particularly to a system for transporting and irradiating bulk material in a manner such that a precisely controllable dose of irradiation is efficiently delivered to the material.

Irradiation technology for medical and food sterilization has been scientifically understood for many years dating back to the 1940's. The increasing concern for food safety as well as safe, effective medical sterilization has resulted in growing interest and recently expanded government regulatory approval of irradiation technology for these applications. United States Government regulatory agencies have recently approved the use of irradiation processing of red meat in general and ground meat in particular. Ground meat such as ground beef is of particular concern for risk of food borne illness due to the fact that contaminants introduced during processing may be mixed throughout the product including the extreme product interior which receives the least amount of heat during cooking. Irradiation provides a very effective means of reducing the population of such harmful pathogens.

The available sources of ionizing radiation for irradiation processing consist primarily of gamma sources, high energy electrons and x-ray radiation. The most common gamma source for irradiation purposes is radioactive cobalt 60 which is simple and effective but expensive and hazardous to handle, transport, store and use. For these reasons, electron beam and x-ray generation are becoming the preferred technologies for material irradiation. An exemplary maximum electron beam energy for irradiation purposes is on the order of 10 million electron-volts (MeV) which results in effective irradiation without causing surrounding materials to become radioactive. The necessary electron beam power must be on the order of 5 to 10 kilowatts or more to effectively expose materials at rates sufficient for industrial processing.

Electron beam and x-ray irradiation systems both employ an electron accelerator to either emit high velocity electrons directly for irradiation or to cause high velocity electrons to collide with a metal conversion plate which results in the emission of x-rays. A number of electron acceleration techniques have been developed over the past several decades including electrostatic acceleration, pumped cylindrical accelerators and linear accelerators.

Electrostatic accelerators are characterized by the use of a direct current static voltage of typically 30 to 90 kilovolts which accelerates electrons due to charge attraction. Electrostatic accelerators are limited in maximum energy by the physical ability to generate and manage high static voltage at high power levels. Electrostatic accelerators using Cockroft-Walton voltage multipliers are capable of energy levels of up to 1 MeV at high power levels, but the 10 MeV energy level utilized by many systems for effective irradiation is not typically available.

Various types of pumped cylindrical electron beam accelerators have been known and used for many years. These accelerators generally operate by injecting electrons into a cylindrical cavity, where they are accelerated by radio frequency energy pumped into the cylinder. Once the electrons reach a desired energy level, they are directed out of the cylinder toward a target.

RF linear accelerators have also generally been in use for many years and employ a series of cascaded microwave radio frequency tuned cavities. An electron source with direct current electrostatic acceleration injects electrons into the first of the cascaded tuned cavities. A very high energy radio frequency signal driven into the tuned cavities causes the electrons to be pulled into each tuned cavity by electromagnetic field attraction and boosted in velocity toward the exit of each tuned cavity. A series of such cascaded tuned cavities results in successive acceleration of electrons to velocities up to the 10 MeV level. The accelerated electrons are passed through a set of large electromagnets that shape and direct the beam of electrons toward the target to be irradiated.

A typical industrial irradiation system employs an electron beam accelerator of one of the types described, a subsystem to shape and direct the electron beam toward the target and a conveyor system to move the material to be irradiated through the beam. The actual beam size and shape may vary, but a typical beam form is an elliptical shape having a height of approximately 30 millimeters (mm) and a width of approximately 45 mm. The beam is magnetically deflected vertically by application of an appropriate current in the scan deflection electromagnets to cause the beam to traverse a selected vertical region. As material to be irradiated is moved by conveyor through the beam, the entire volume of product is exposed to the beam. The power of the beam, the rate at which the beam is scanned and the rate that the conveyor moves the product through the beam determines the irradiation dosage. Electron beam irradiation at the 10 MeV energy level is typically effective for processing of food materials up to about 3.5 inches in thickness with two-sided exposure. Conversion of the electron beam to x-ray irradiation is relatively inefficient but is effective for materials up to 18 inches or more with two-sided exposure.

The prior art industrial irradiation systems previously described are typically relatively inflexible and require careful setup, calibration and operation to deliver the irradiation dosage required for safe, effective sterilization. The output energy levels are established by the structure of the accelerator and are relatively constant. The output power levels are determined by equipment settings and calibration and may vary significantly.

Prior art irradiation systems of the direct electron beam type typically employ electron beam accelerators to generate a stream of electrons at energy levels of a maximum of 10 MeV. Scanning of the electron beam is performed using magnetic deflection similar to the type used for television raster scan. The dosage of irradiation delivered to a product passing by the accelerator is determined by the power of the beam, the beam scanning speed and the rate that the product is moved by the conveyor through the beam. This dosage is typically set manually by an operator for a given material to be irradiated, and is expected to remain constant at that setting. While this type of system can deliver effective radiation for a homogeneous product line, there are a number of shortcomings associated with the system. First, there are a number of factors that may cause the output power to vary after being set by the operator, including changes in temperature of critical components or shifting of frequency of the critical radio frequency acceleration drive subsystem. Second, it is cumbersome and inefficient to change the irradiation dosage to be delivered by the system if some different product is to be irradiated that requires different exposure. This characteristic of prior art systems generally dictates that the product mix to be irradiated can change very little during the course of processing. Third, there is no indication that irradiation exposure has been delivered to the products. Physical dosimeters must be placed periodically on the conveyor or within packages of products and examined to determine that products have indeed been irradiated at the specified dosage. Until the dosimeters have been verified, all product that has passed through the irradiation system must be held in quarantine awaiting verification that the processing was successful. If there is a failure indicated by an underexposed trailing dosimeter, all of the product that is held in quarantine is of unknown status, with some amount at the front of the batch probably exposed and some amount at the back of the batch probably unexposed. Depending on the severity of the unknown product irradiation implications, the entire batch may have to be destroyed.

A conveyor-based irradiation system that addresses many of the shortcomings of prior art systems is disclosed in U.S. application Ser. No. 09/685,779 filed Oct. 10, 2000 for "Irradiation System And Method" by S. Lyons, S. Koenck, B. Dalziel and J. Kewley, which is hereby incorporated by reference. Improvements in the state of the art may also be achieved in a bulk material irradiation system, which is the subject of the present invention.

BRIEF SUMMARY OF THE INVENTION

The present invention is a bulk material irradiation system. An input is provided for the insertion of bulk material. A bulk material tube is connected to the input, forming a path for bulk material flow. A pressurizing assembly is connected to the bulk material tube for forcing the bulk material to flow through the bulk material tube. An irradiation assembly provides ionizing radiation to irradiate the bulk material passing adjacent to the irradiation assembly in the bulk material tube. Irradiated bulk material exits the bulk material tube through an output.

DETAILED DESCRIPTION

Figure 1A:
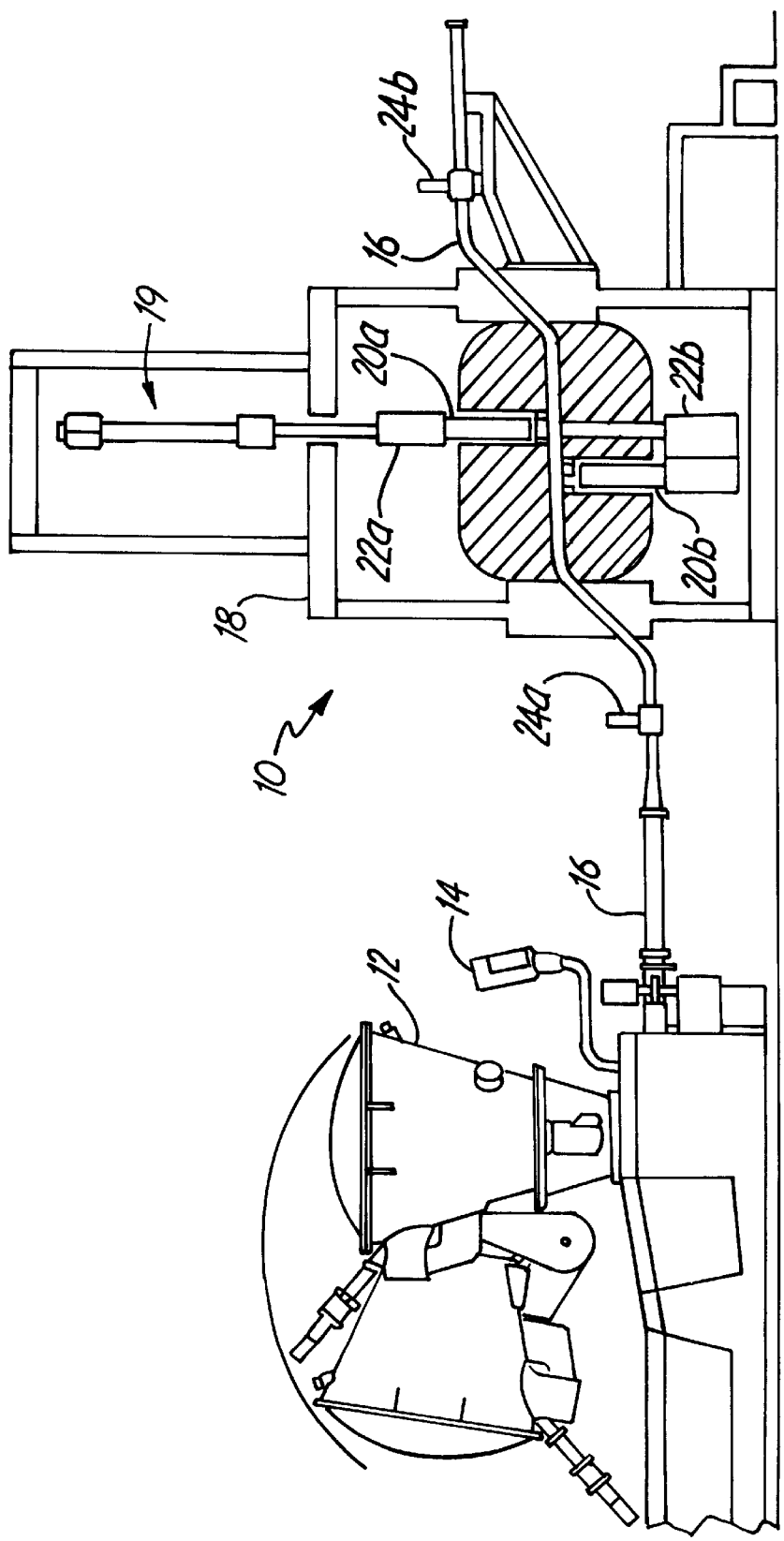
FIG. 1A is a front section view.
Figure 1B:
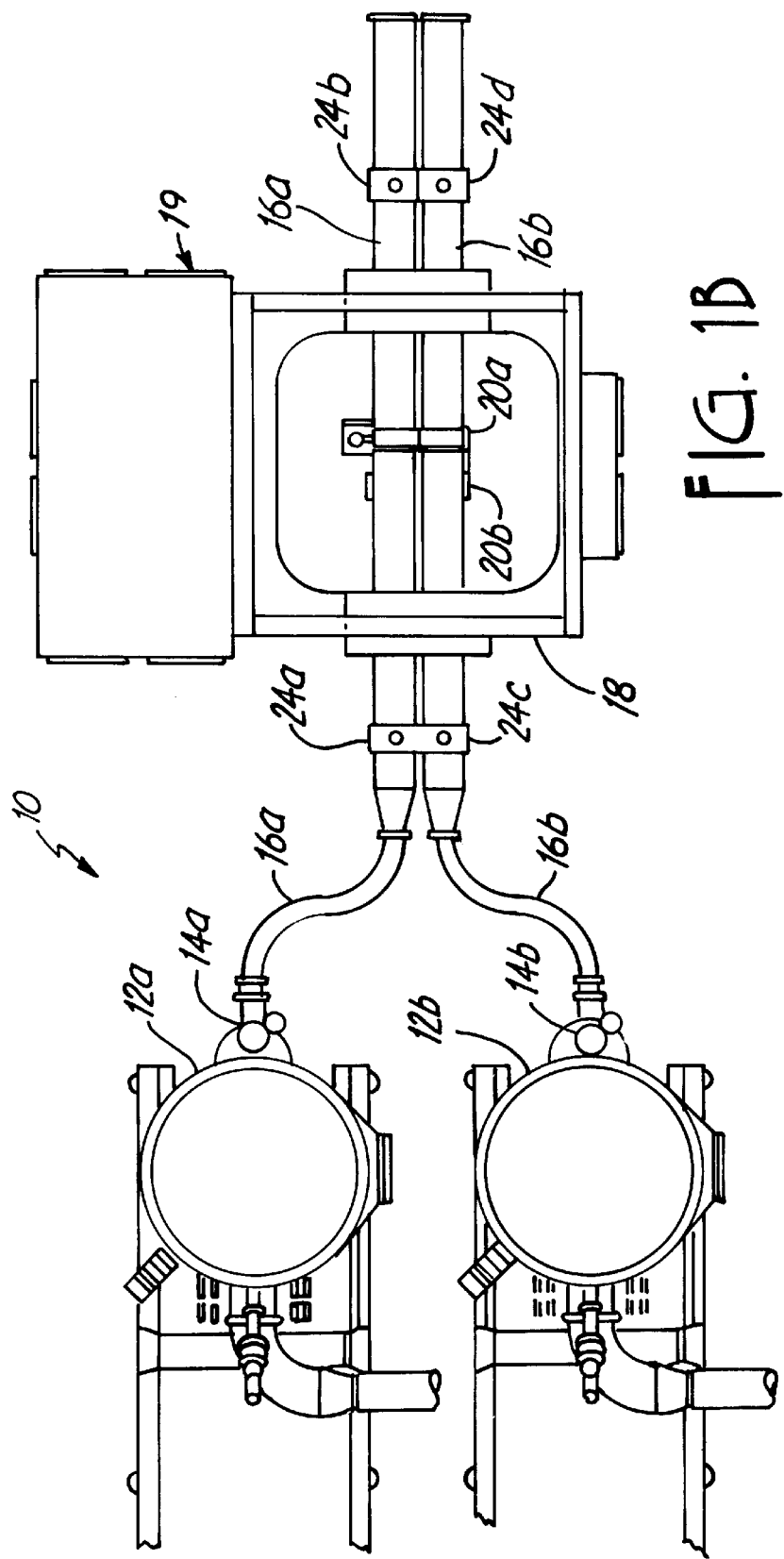
FIG. 1B is a top section view, illustrating the bulk material irradiation system of the present invention

FIG. 1A is a front section view, and FIG. 1B is a top section view, illustrating bulk material irradiation system 10 of the present invention. As shown in FIG. 1A, bulk irradiation system 10 includes input hopper 12, pump assembly 14, bulk material tube 16, irradiation module 18, accelerator assembly 19, scan horns 20a and 20b, magnet assemblies 22a and 22b, and dosimetry shuttle ports 24a and 24b. Input hopper 12 receives bulk material to be irradiated, such as fresh ground beef in an exemplary embodiment, and the bulk material is forced by pump assembly 14 to flow through bulk material tube 16. In an exemplary embodiment, pump assembly 14 also removes oxygen from the bulk material flowing through tube 16, to enhance the effects of irradiation. University research and industry experience has shown that irradiation of meats such as ground beef in the presence of ordinary concentrations of oxygen can cause oxidation of lipids that results in degradation of the quality and consumer acceptance of the processed product. It has been demonstrated that irradiation in a modified atmosphere that excludes oxygen during the irradiation process can eliminate this undesirable effect.

Bulk material flows through tube 16 into irradiation module 18 at an upward angle, so that the walls of irradiation module 18 are able to provide effective shielding from radiation that would otherwise potentially exit irradiation module 18 and present a hazard to operating personnel. Accelerator assembly 19 generates an electron beam or other comparable irradiation beam that is directed through magnet assembly 22a and scan horn 20a to irradiate bulk material flowing in tube 16 from the top side, and also is directed through magnet 22b and scan horn 20b to irradiate bulk material flowing in tube 16 from the bottom side. Although double-sided irradiation is shown in the exemplary embodiment of FIG. 1A as being provided by a single accelerator and selectively directed in two irradiation beam paths, it should be understood by those skilled in the art that dual accelerators could be employed with similar effect. In addition, although the exemplary embodiment of FIG. 1A shows double-sided irradiation of bulk material flowing in tube 16, it should be understood by those skilled in the art that single-sided irradiation may be employed where sufficiently small depths of penetration area required and/or where the energy of the electron beam generated by accelerator assembly 19 is sufficiently high to achieve the necessary penetration. A further discussion of single-sided and double-sided irradiation will occur below with respect to FIGS. 2 and 3. After bulk material flowing through tube 16 has been irradiated, the material exits irradiation module 18 at an upward angle, again so that the walls of irradiation module 18 are able to provide effective shielding from radiation that would otherwise potentially exit irradiation module 18 and present a hazard to operating personnel.

Dosimetry shuttle port 24a is provided in bulk material tube 16 between input hopper 12 and irradiation module 18, allowing the insertion of a dosimetry module into the flow of bulk material in tube 16. The dosimetry module is therefore able to pass through irradiation module 18 in tube 16, and receive irradiation from scan horns 20a and 20b. The dosimetry module can then be ejected from tube 16 through dosimetry shuttle port 26a on the opposite side of irradiation module 18, for analysis and calibration of the irradiation dose delivered by the system.

FIG. 1B is a top section view of bulk material irradiation system 10, with a few modifications according to another exemplary embodiment of the invention. FIG. 1B illustrates an embodiment having two input hoppers 12a and 12b, two pump assemblies 14a and 14b, and two bulk material tubes 16a and 16b passing though irradiation module 18. Dosimetry shuttle ports 24a and 24b are provided in bulk material tube 16a, and dosimetry shuttle ports 24c and 24d are provided in bulk material tube 16b. It should be understood by those skilled in the art that any number of bulk material tubes such as tubes 16a and 16b may be employed to implement bulk material irradiation system 10 of the present invention, with one or more accelerator assemblies 19 and related magnets and scan horns. A system is preferably designed to achieve a desired rate of bulk material throughput while also ensuring that proper irradiation doses are received, employing an appropriate number of bulk material flow paths and irradiation sources to accomplish this result. More details of exemplary bulk material flow path arrangements will be discussed later.

The beneficial effects of irradiation of food are caused by the absorption of ionizing energy that result in the breaking of a small percentage of the molecular bonds of molecules in the product. Most of the molecules in food are relatively small and are therefore unaffected. The DNA in bacteria, however, is a very large molecule and is highly likely to be broken and rendered unable to replicate. The absorption of radiation in the food product causes the radiation intensity to be reduced according to a depth-dose relationship that is scientifically well known.

Figure 2:
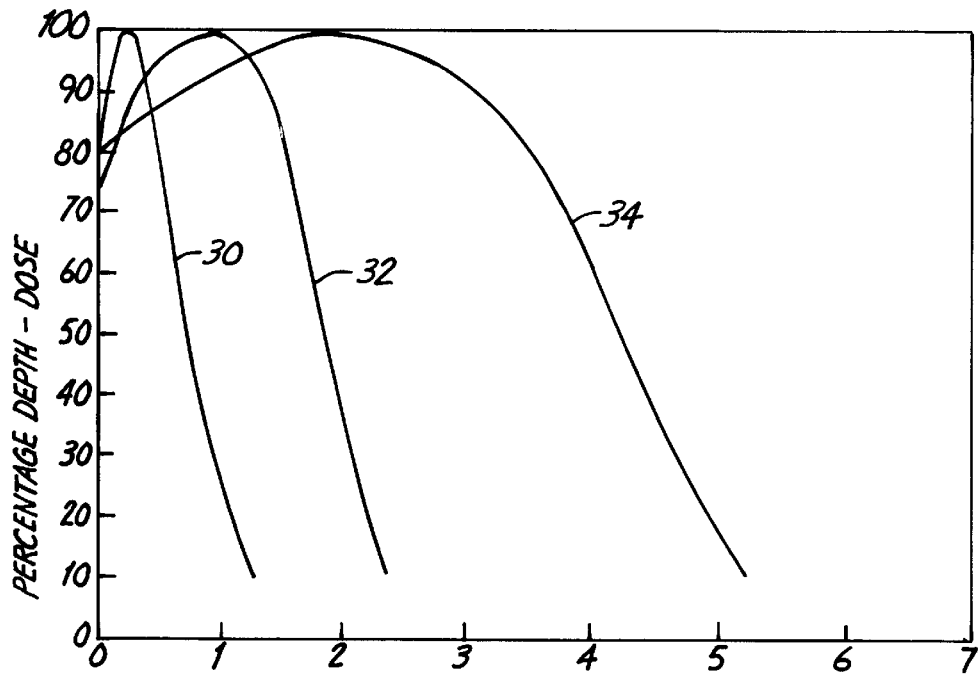
FIG. 2 is a graph illustrating depth-dose relationships for irradiation beams having electrons with varying energy levels.

FIG. 2 is a graph illustrating depth-dose relationships for irradiation beams having electrons with varying energy levels. Curve 30 represents the depth-dose relationship for 1.8 MeV electrons, curve 32 represents the depth-dose relationship for 4.7 MeV electrons, and curve 34 represents the depth-dose relationship for 10.6 MeV electrons. As shown by curves 30, 32 and 34, the radiation intensity actually increases to a maximum at a distance somewhat interior to the surface of the product being irradiated due to scatter emission of radiation from electron collisions with food molecules. After the maximum is achieved, absorption causes the relative intensity to begin to fall off until virtually all of the radiation has been absorbed. At the "tails" of the depth-dose curves the intensity is much less than the maximum, but still results in an incremental amount of beneficial irradiation. Single sided application of radiation that is required to maintain a moderate ratio between maximum and minimum exposure must necessarily waste most of this tail of radiation intensity. Curve 30 for example illustrates that the percentage dose is at approximately 50% of the maximum value at a penetration depth of about 0.7 cm (or 0.28 inches). Exposure of food of this thickness would result in a maximum/minimum ratio of 1/0.5=2.0, while approximately one-third of the beam power would pass through the material and be wasted. While single-sided irradiation can deliver proper doses of irradiation to product, the potential waste of power and limited depth of product that may be effectively irradiated can limit the effectiveness of the irradiation system.

Figure 3:
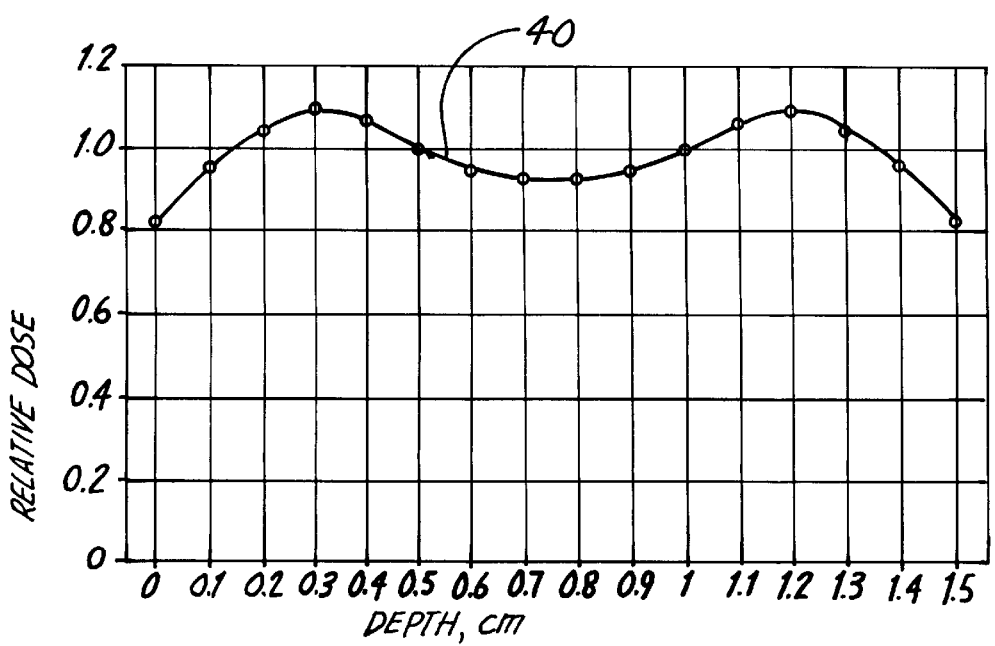
FIG. 3 is a graph illustrating a depth-dose relationship for two-sided 1.8 MeV exposure of a product having a thickness of 1.5 cm. (or 0.6 inches).

A solution to this waste and inefficiency problem is to expose the product to the electron beam from two sides. FIG. 3 is a graph illustrating a depth-dose relationship for two-sided 1.8 MeV exposure of a product having a thickness of 1.5 cm. (or 0.6 inches), shown by curve 40. The depth of effective irradiation is substantially greater than the single sided exposure and the maximum/minimum ration is substantially lower resulting in more precise and consistent product exposure. While two-sided irradiation is preferred for maximum efficiency and most consistent exposure, generation of the two sided radiation sources adds complexity. The typical solutions are to either pass product through the radiation source once per side which requires twice as long to process, or to create two independent accelerators which is effective but can be costly and complicated.

Food may be irradiated at a number of points during processing and distribution depending on the product shape, thickness and packaging. Foods that are relatively thick require relatively high energy radiation exposure for consistent penetration to the interior of the product, for example, two sided 10 MeV electron beam exposure is necessary to irradiate meat that is up to 3.5 inches thick. Foods that are not as thick, however, may be effectively irradiated by much lower energy sources, for example, products that are 0.6 inches thick may be irradiated by two-sided 1.8 MeV electron beam exposure. The advantages of the lower electron beam energy are that a less complex accelerator system may be used to generate the beam, and the shielding requirements are not as great due to the reduced penetration of the beam. The primary challenge for lower energy irradiation systems is material handling to accurately prepare, present and manage the product exposure. All food irradiation systems have the objective of reducing the levels of harmful food borne pathogens. To ensure that no cross contamination or recontamination of irradiated food by any other pathogens can occur, it is necessary that food either be irradiated in final pathogen impermeable packaging, or be maintained in an environment that eliminates the recontamination potential.

A number of sources are potentially available for generating ionizing radiation that is able to effectively irradiate product. Some sources that may be used include gamma sources, high energy electrons and x-ray radiation. The use of these sources for irradiation is generally known in the art. The present invention will hereafter be described as it pertains to the use of a linear accelerator for producing a beam of high energy electrons for irradiation.

Figure 4:
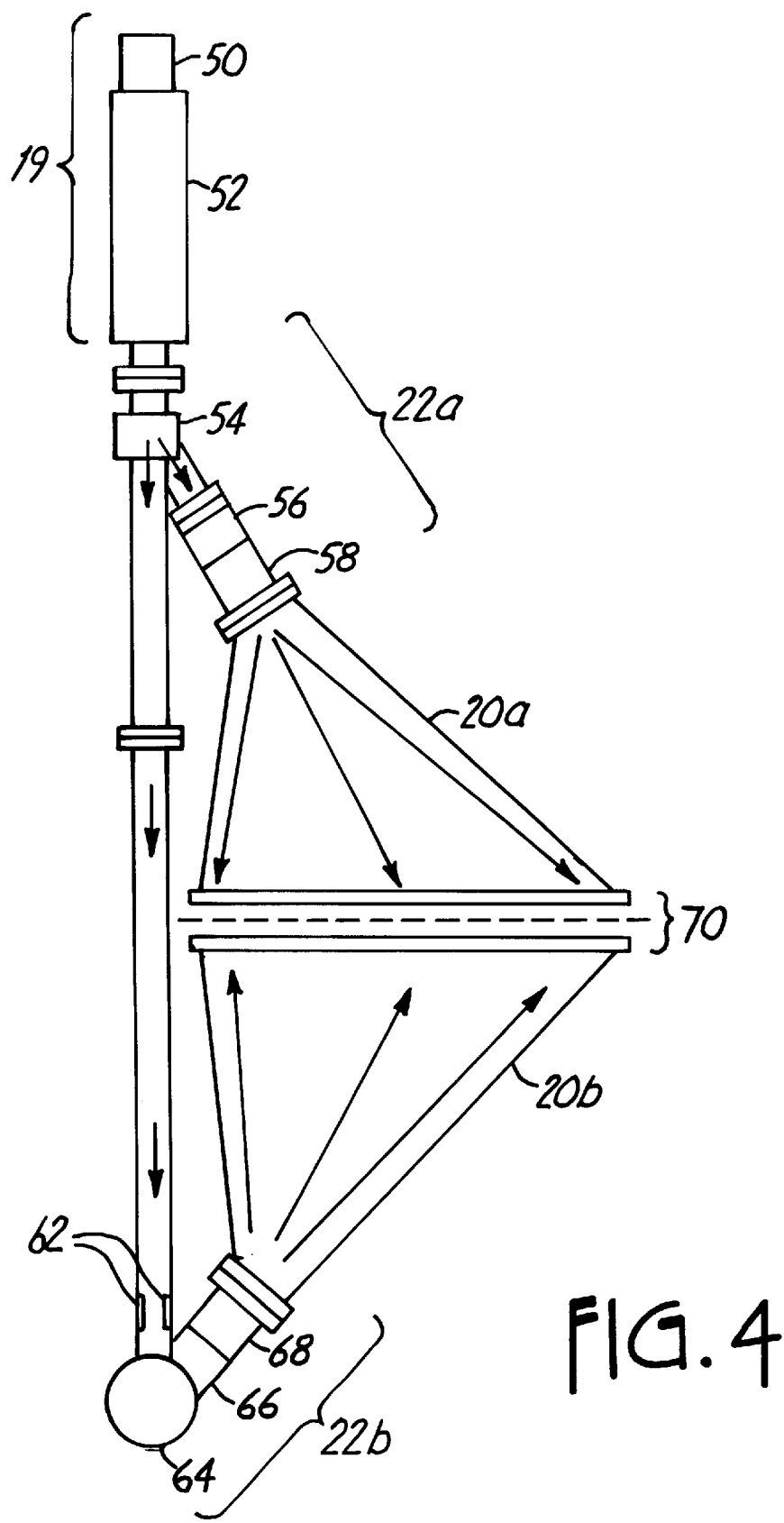
FIG. 4 is a diagram illustrating an electron beam acceleration and scanning system for providing two-sided irradiation to a product.

FIG. 4 is a diagram illustrating an electron beam acceleration and scanning system for providing two-sided irradiation to a product. The system includes an accelerator having electron gun 50 and accelerator waveguide 52, upper magnet assembly 22a including beam deflection magnet 54, upper quadrupole magnet 56 and upper scan magnet 58, upper scan horn 20a, beam sensors 62, lower magnet assembly 22b including bending magnet 64, lower quadrupole magnet 66 and lower scan magnet 68, and lower scan horn 20b. Material to be irradiated passes through area 70 between upper scan horn 20a and lower scan horn 20b. Single accelerator 19 is shared between the upper exposure subsystem and the lower exposure subsystem. Beam deflection magnet 54 is controlled by an applied current to either allow an accelerated electron beam from accelerator waveguide 52 to travel directly downward or to be deflected sideways toward upper scan horn 20a. If the beam is deflected toward upper scan horn 20a, normal beam scanning operation occurs. This consists of passing the beam through upper quadrupole magnet 56 to form the beam spot to a larger elliptical shape, and to apply a current through upper scan magnet 58 to deflect the beam over the traversal range of upper scan horn 20a. The angle-fed asymmetrical shape of upper scan horn 20a will result in the beam spot position steps being different depending on the particular position of the beam. This step position variation may be eliminated by a computer controlled position management system which maps a physical spot location to a particular beam deflection angle and applies an appropriate current to the deflection magnet to locate the beam spot to that exact position. For a typical scan traversal range of 92 cm (or 36 inches) and a spot size of typically 6×9 cm., a total of 32 position steps would be needed to fully cover the scan range. Each of these 32 steps would have associated a computer stored scan magnet control value of typically 10 bits or 1024 values that provides the resolution to locate that particular beam spot with necessary precision. The spot size will be somewhat larger at the outer extremity of the scan traversal range, but since the spot location increments are all exactly the same, the result is increased overlap and exactly the same exposure as the near extremity.

If the beam is not deflected toward upper scan horn 20a, it continues downward until it passes through sensors 62 to bending magnet 64. Sensors 62 are structures consisting of two pairs of parallel sensing plates that the electron beam passes through, generating a differential voltage if the beam is nearer to one of the plates than the other. This voltage may be sensed and used to adjust the current in a small pair of magnets associated with upper beam deflection magnet 54 to very accurately steer the beam into the receiving region of lower bending magnet 64. Lower bending magnet 64 has a current flowing through it that bends the beam upward toward lower scan horn 20b. The operation of the lower scan subsystem is identical to the upper scan subsystem and the beam is directed alternately between the two by the alternate control of current through deflection magnet 54 under computer control.

The upper and lower scan subsystems of FIG. 4 are offset so that they are not located exactly opposite each other, which allows the placement of sensors opposite material plane area 70 that can be used to accurately determine the actual location of the beam spot. These sensors may also be used to sense the presence of material under the scan horns so that no scanning power is wasted when no material is present.

It is possible to selectively control the power of each successive pulse that makes up an electron beam. A detailed disclosure of such dynamic power control may be found in U.S. application Ser. No. 09/685,779 filed Oct. 10, 2000 for "radiation System And Method" and assigned to Mitec, inc., the same assignee as the present application. The aforementioned U.S. application Ser. No. 09/685,779 is hereby incorporated by reference in its entirety. In an exemplary embodiment of the irradiation system of the present invention, a sensor may be provided on a side of bulk material tube 16 opposite scan horn 20a (and also on a side opposite scan horn 20b) to measure a level of ionizing radiation delivered to the bulk material. The power of each pulse of the electron beam may then be dynamically controlled based on the sensor measurements to maintain a desired dose of radiation delivered to the bulk material. In addition, pump assembly 14 maybe controlled to adjust the flow rate of bulk material in tube 16 based on sensor measurements to further control the irradiation dosage delivered to the bulk material.

Figure 5:
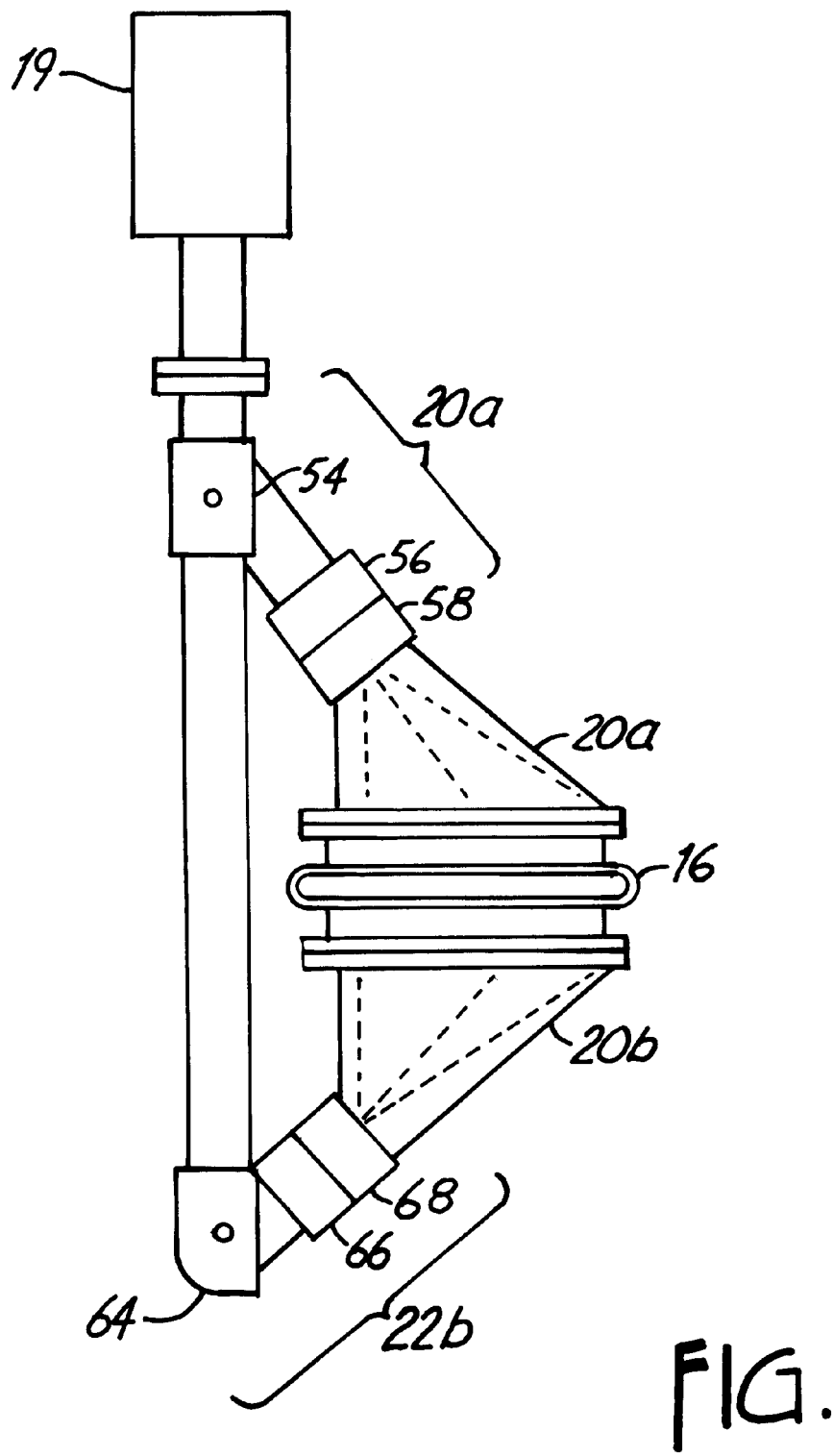
FIG. 5 is a diagram showing a first modified version of the two-sided exposure system of FIG. 4.

FIG. 5 is a diagram showing a modification of the two-sided exposure system of FIG. 4 with a pair of reduced size scan horns 20a and 20b placed opposite a flattened tube shaped structure 16. Tube shaped structure 16 is a closed pipe-like feeder that may receive material through a pipe from a pump system (e.g., pump assembly 14, FIG. 1) that forces material into a flattened shape to move it through irradiation scan horns 20a and 20b for irradiation exposure. This system may handle all types of liquid and many types of formable or soft materials such as ground meats that may be forced through tube 16 under pressure. The thickness of the material to be irradiated is determined by the thickness of the flattened tube structure 16. A feeder of 8 inches wide and 1.6 inches thick has approximately the same cross-sectional area as a circular pipe of 4 inches in diameter, which is a preferred size for a material pumping system.

Figure 6:
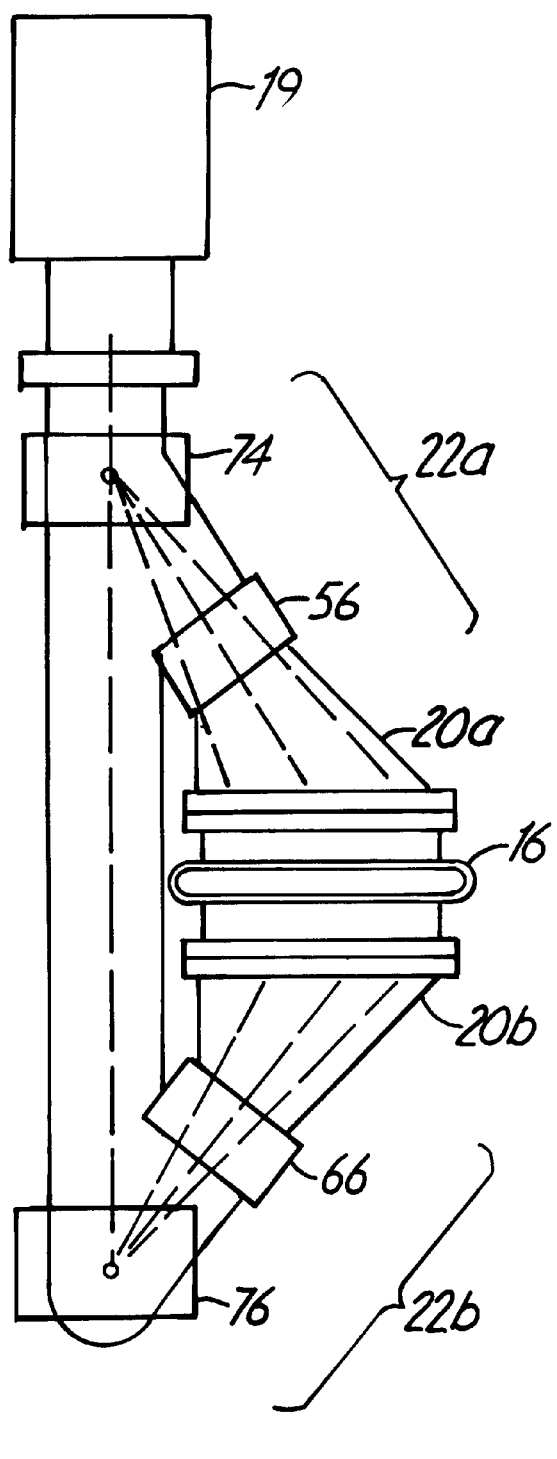
FIG. 6 is a diagram showing a second modified version of the system of FIG. 4.

FIG. 6 is a diagram showing a modified version of the system of FIG. 4, whereby combined upper deflection and scan magnet 74 is employed to perform the function of the scan magnets and the function of the upper deflection magnet, and combined lower bending and scan magnet 76 is employed to perform the function of the lower bending magnet and the function of the lower scan magnet. The configuration of FIG. 6 reduces the number of magnets that are required for operation of the system. In either system, an embedded computer control system is employed to set the current in the deflection and scan magnets and control the generation and timing of an irradiation pulse to precisely apply the exposure to sequentially stepped positions.

In a typical operational mode of the invention (as shown in FIG. 5, for example), a computer directs an electron beam toward upper scan horn 20a by selecting a value of current in upper beam deflection magnet 54 that bends the electrons the appropriate amount. Quadrupole magnet 56 forms the beam to the specified elliptical shape and size, and the computer sets a predetermined current value in scan magnet 58 to direct the beam to the desired beam spot position and the accelerator is pulsed to irradiate the selected position. The computer then sets the next beam spot position by controlling the scan magnet current and the next pulse is applied with a nominal 50% overlap of the first beam spot. Once a complete sweep of the beam spots is completed for the top side of the material feeder tube, the computer selects the appropriate current in the beam deflection magnet to cause the beam to travel to the lower bending magnet. In similar fashion, the computer controls the beam position by selecting a current value in lower scan magnet 68, the accelerator is pulsed, and the cycle continues until the entire lower region is irradiated by a complete sweep. By using this system, single accelerator 19 may be shared alternately between the upper and lower scan horns to provide the preferred two-sided irradiation exposure.

Figure 7A:
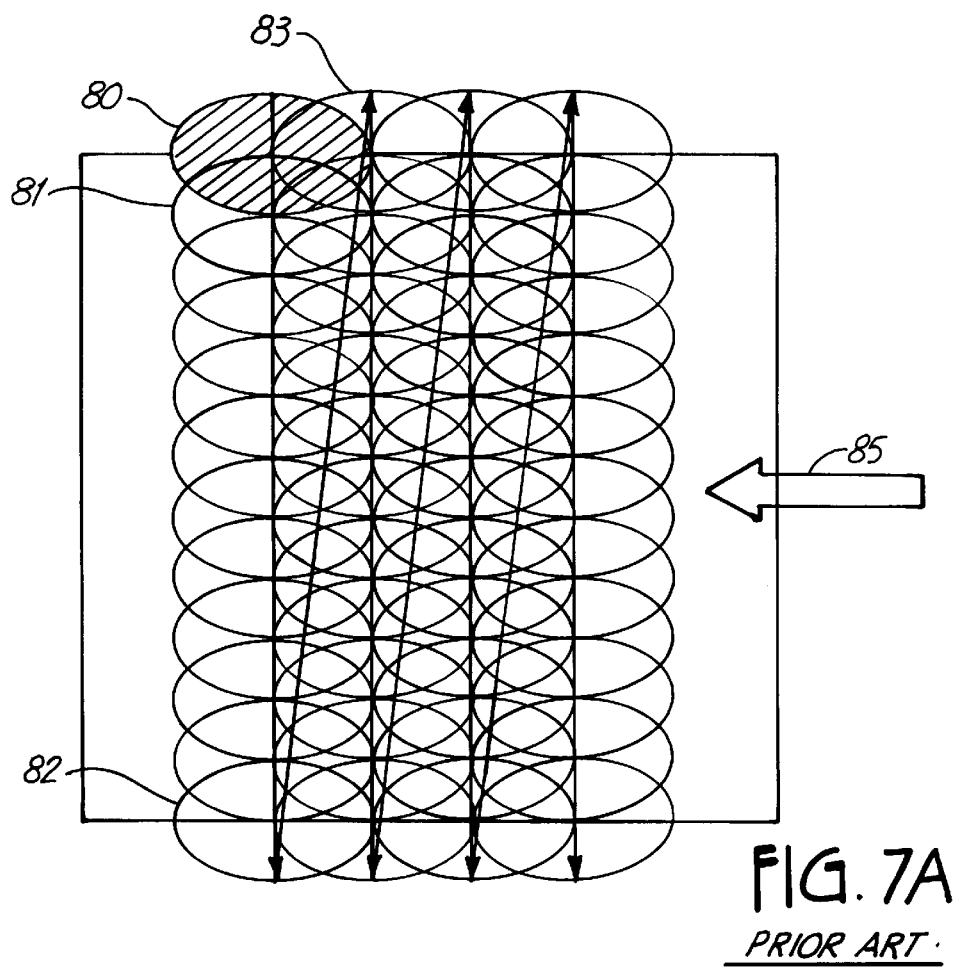
FIG. 7A is a diagram illustrating a typical scanning configuration for electron beam devices.
Figure 7B:
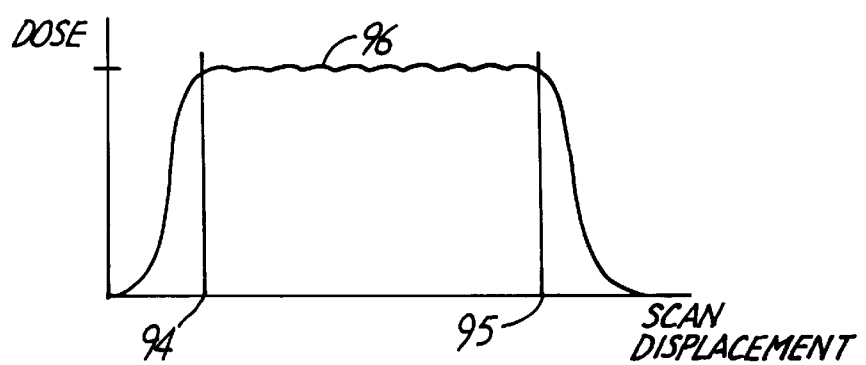
FIG. 7B is a graph illustrating the relative dose delivered by the scanning configuration shown in FIG. 7A.

FIG. 7A is a diagram illustrating a typical scanning configuration for electron beam devices, and FIG. 7B is a graph illustrating the relative dose delivered by the scanning configuration shown in FIG. 7A. An electron beam is typically generated as a timed pulse of 10 to 15 microseconds in duration with a repetition rate of typically 500 pulses per second. The electron spot is directed by magnets toward the material to be irradiated in sequentially overlapped positions with an overlap of nominally 50% of the spot size to provide a uniform radiation exposure. Material is typically moved through the scanned spot region at a rate that allows 50% overlap of the spot in the horizontal dimension as well.

An electron beam spot is formed to an elliptical shape of approximately 3:2 width-to-height ratio with a horizontal spot size of typically several centimeters. The beam spot is positioned in a vertical dimension by driving a current into a scanning electromagnet with an initial position beginning nominally at the extremity of a total scan traversal range which is indicated in FIG. 7A at location 80. A pulse of accelerated electrons is generated and applied to the selected physical location 80 to provide an irradiation dose to that physical position. A control circuit then drives a new current magnitude into the scan electromagnet to move the beam spot location to position 81 to overlap position 80 by 50%, the pulse is generated and irradiation exposure is applied to that position. The process continues until position 82 is selected, pulsed and irradiated. The control circuit then applies the current associated with the original position 80 to the scan electromagnet to quickly move the spot position back to the initial vertical position of location 80. During the time that the vertical scan from position 80 to 82 is progressing, the material is being moved horizontally through the scan traversal range. If the material moves at a velocity that causes the horizontal displacement during this scan time to be half of the width of the spot, then the actual position of the spot after position 82 will be at position 83, which results in 50% horizontal overlap of position 83 with position 80. This dual vertical and horizontal overlap results in uniform total exposure of the material as illustrated in FIG. 7B. The vertical lines 94 and 95 indicate the width of the material that is moved through the scan traversal range. The total dose applied to the material is indicated by the curve 96 and is nearly constant over the area that the overlap is 50%. The double vertical and horizontal overlap results in total average exposure equal to 4 times the individual beam spot exposure.

Prior art scanned and pulsed electron beam irradiation systems as described in FIGS. 7A and 7B depend on the uniformity of the material to be irradiated, invariant velocity of material movement, constant electron beam power and precise positioning of the electron beam spot to achieve uniform dosage. If any of these parameters varies, the resulting dosage will be affected either upward or downward resulting either in potential overexposure and material quality reduction, or in less effective reduction of the targeted harmful pathogens that the irradiation process is intended to achieve.

Figure 8A:
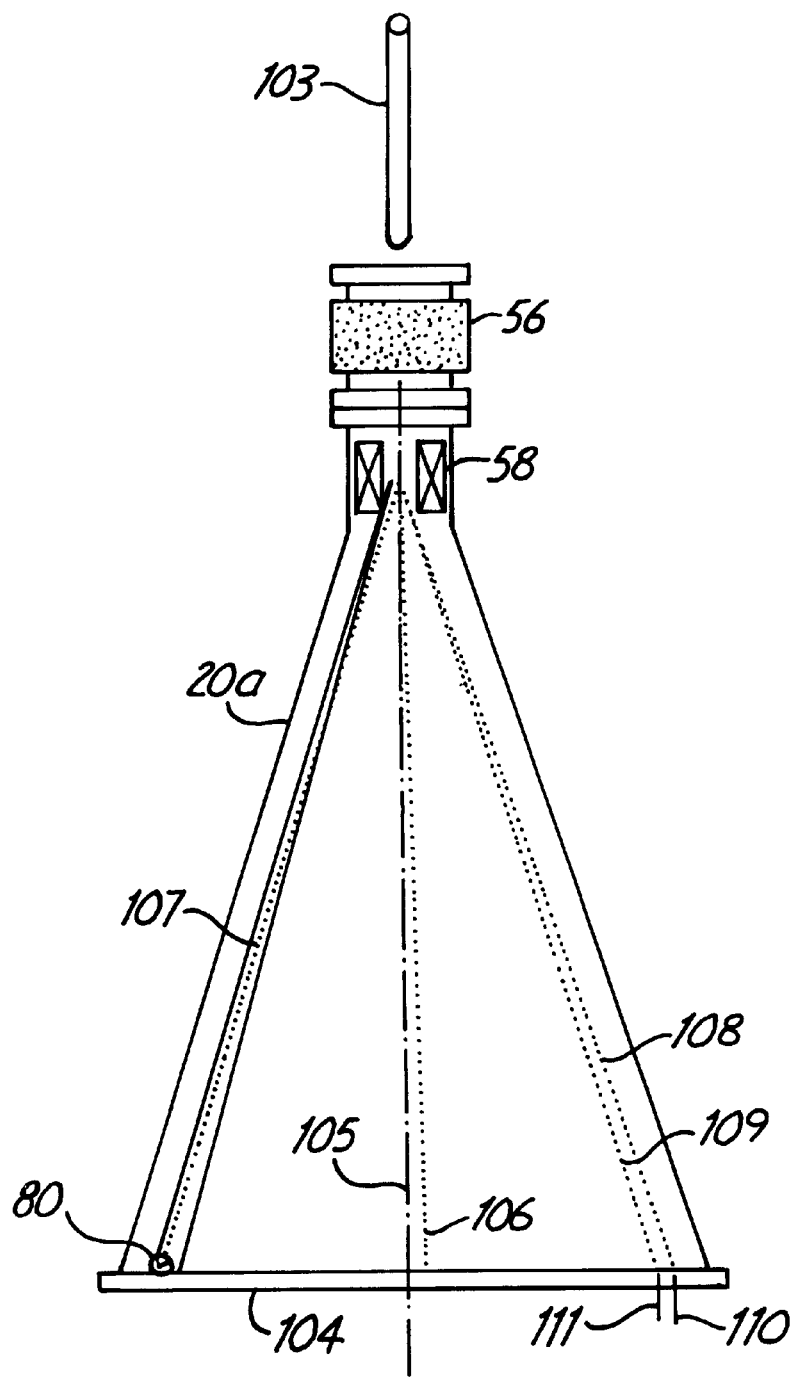
FIG. 8A is a diagram illustrating a typical electron beam scanning and deflection system.

FIG. 8A is a diagram illustrating a typical electron beam scanning and deflection system. Scan horn 20a, typically consisting of an evacuated metal enclosure, provides an environment that accelerated electrons can propagate through with minimal loss of energy. Scan horn 20a is sufficiently large that the electron beam spot with an elliptical shape as described in FIG. 7A does not contact any of the metal walls of scan horn 20a.

Accelerated electrons are received from an accelerator in compact cylindrical beam 103 with a diameter of typically 0.5 cm. The compact cylindrical beam of electrons 103 is formed into the preferred elliptical spot shape 80 by quadrupole magnet 56 typically consisting of a pair of electromagnets with ferromagnetic pole structures shaped to act on the electron beam in a manner analogous to an optical lens, whereby the amount of deflection of the electrons is proportional to the radial displacement of the electrons from the center of the beam. The result is that the beam spot intensity is spread into an elliptical profile wider than compact cylindrical shape 103 that is employed during the acceleration of the electrons to allow application of each individual pulse of the beam to a larger amount of material. If this method were not used, the relative power of the accelerator would have to be reduced to avoid overexposure of material at each spot, and the resultant processing speed would be reduced.

Scanning electromagnet 58 receives the elliptically formed and spread electron beam spot 80 at the entrance to scan horn 20a and deflects beam spot 80 in an angular amount proportional to the electromagnet current. If the current steps applied to the scanning electromagnet 58 increase in identical amounts, the deflection of the electron beam spot will be also be an identical angle. The preferred maximum deflection is approximately 20 degrees of arc in either direction from beam center 105, as is indicated by rays 107 and 108 resulting in a total deflection of approximately 40 degrees. The linear scan traversal range dictates the length of scan horn 20a to maintain the total 40 degree beam deflection. A scan horn with a scan traversal range of 75 cm would require a scan horn vertical length of 103 cm. Since the beam deflection amounts caused by the application of constantly spaced current steps in scanning magnet 58 result in constantly spaced angles of deflection, it can be seen that the linear displacement per current step at the center of the scan horn exit region 105 is smaller than the linear displacement per current step at the maximum deflection regions 107 and 108. With a beam spot that is 6 cm tall, the preferred 50% overlap would require a step size of 3 cm. For a scan traversal range of 75 cm, this would translate to an angle of deflection from the center 106 of 1.6683 degrees which would move the beam to position 106. Application of constant current steps that cause sequentially increased currents would cause sequentially increased deflection angles until the maximum deflection 108 is reached. Since discrete steps are required, the maximum deflection amount would be 20 degrees divided by the step angles of 1.6683 degrees, which would be 12 step values for a total angle of 20.02 degrees. The next step inward 109 from the maximum deflection 108 would be 11 step values for a total deflection of 18.352 degrees. The linear displacements 110 and 111 would be 37.54 and 34.18 cm. respectively, which would result in an overlap amount of 3.36 cm. or 44% overlap of the spots at the edge. The resulting irradiation exposure would consequently be below the specified target value by 6% at the outer edges of the irradiation scan area.

Figure 8B:
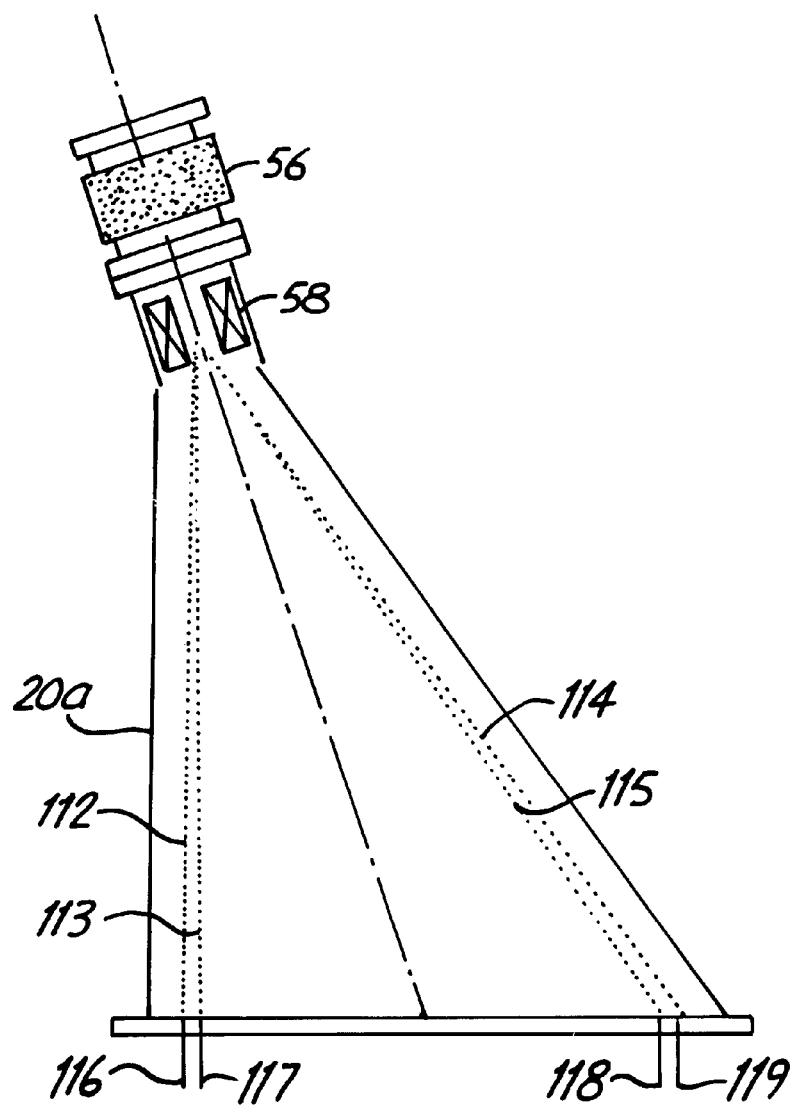
FIG. 8B is a diagram illustrating a scan horn configured in an oblique configuration.

Scan horn structures may be desired that employ deflection angles that are within the 40 degree maximum total deflection, but that use an oblique structure that exaggerates the deflection angle amount at the outer extremities of the scan traversal range. FIG. 8B is a diagram illustrating scan horn 20a configured in such an oblique configuration. Similar to the geometry at the extremities of the scan horn shown in FIG. 5A, the linear deflection is greater at the outer angle 114 than the inner angle 112. In the case of the oblique scan horn, the differential angle of deflection for the 3 cm step between 116 and 117 with 50% spot overlap is the minimum at the inner beam position 112. An oblique scan horn with a scan traversal range of 75 cm would require a scan horn vertical length of 89.38 cm. The deflection angle required for 3 cm deflection from the inner angle 112 to the next angle 113 is 1.922 degrees. A deflection to the outer deflection position 114 would require 21 steps of 1.922 degrees for a total deflection of 40.36 degrees. The deflection at the 20th step 115 would be 38.44 degrees. The difference in the linear displacement at the outer extremity indicated by 119 and 118 would be 5.02 cm., which would result in only 16% overlap. The irradiation exposure would be below the specified target value by 40% at the outer edge of the irradiation scan area between 115 and 114, absent some sort of compensation scheme.

Figure 9:
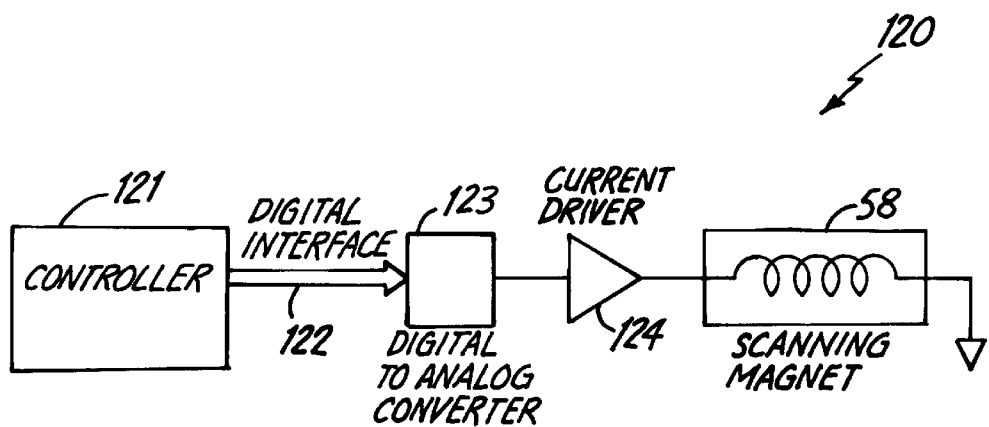
FIG. 9 is a schematic block diagram of control system 120 that provides the capability to locate the beam spot position with improved linear precision.

FIG. 9 is a schematic block diagram of control system 120 that provides the capability to locate the beam spot position with improved linear precision. Controller 121 is used to generate a digital control value that is output through digital interface 122 to digital to analog converter 123. The output of digital to analog converter 123 is input to current driver 124 that generates a continuously variable current output that is precisely proportional to the analog voltage input. This current output is driven through scanning magnet 58 to deflect the electron beam by an amount proportional to the magnet current. The precision of the location of the electron beam spots is dependent on the precision of the digital outputs of controller 121. An exemplary embodiment of controller 121 is a digital computer with digital precision of 16 bits or more. This digital precision allows each beam spot position to be individually located by outputting a scan magnet deflection current that corresponds to a constant increment in linear displacement.

In the offset scan horn example of FIG. 8B, it is desired that each increment of the scan spot location be spaced by an amount of 3 cm. Table 1 shows the deflection angles that result in an incremental spot location of 3 cm. 12 bits of digital precision are sufficient to resolve a total of 4096 steps of current value. A 12 bit digital to analog converter with a control value input as indicated in Table 1 will result in the "X Actual" linear displacement. The "Error %" is an indication of the difference between the "X Actual" position and the exact "X distance" position that would result from 3 cm. incremental distance. As can be seen, the maximum error is less than 0.4%, which will result in very consistent and precise exposure control, especially in the case of an offset scan horn such as the type shown in FIG. 8B.

TABLE 1

| Step | Angle | X distance | Control Value | X Actual | Error % |
|---|---|---|---|---|---|
| 1 | 0.0000 | 0.0000 | 0 | 0 | 0.0000 |
| 2 | 1.9106 | 3.0000 | 191 | 2.9990 | 0.0334 |
| 3 | 3.8170 | 6.0000 | 382 | 6.0047 | -0.1558 |
| 4 | 5.7150 | 9.0000 | 572 | 9.0079 | -0.2638 |
| 5 | 7.6005 | 12.0000 | 760 | 11.9992 | 0.0259 |
| 6 | 9.4696 | 15.0000 | 947 | 15.0007 | -0.0240 |
| 7 | 11.3185 | 18.0000 | 1132 | 18.0024 | -0.0811 |
| 8 | 13.1439 | 21.0000 | 1314 | 20.9936 | 0.2147 |
| 9 | 14.9425 | 24.0000 | 1494 | 23.9958 | 0.1412 |
| 10 | 16.7115 | 27.0000 | 1671 | 26.9974 | 0.0866 |
| 11 | 18.4483 | 30.0000 | 1845 | 30.0029 | -0.0973 |
| 12 | 20.1507 | 33.0000 | 2015 | 32.9987 | 0.0425 |
| 13 | 21.8168 | 36.0000 | 2182 | 36.0059 | -0.1951 |
| 14 | 23.4450 | 39.0000 | 2344 | 38.9907 | 0.3084 |
| 15 | 25.0340 | 42.0000 | 2503 | 41.9924 | 0.2537 |
| 16 | 26.5829 | 45.0000 | 2658 | 44.9943 | 0.1889 |
| 17 | 28.0910 | 48.0000 | 2809 | 47.9980 | 0.0674 |
| 18 | 29.5579 | 51.0000 | 2956 | 51.0043 | -0.1446 |
| 19 | 30.9834 | 54.0000 | 3098 | 53.9927 | 0.2440 |
| 20 | 32.3676 | 57.0000 | 3237 | 57.0053 | -0.1761 |
| 21 | 33.7106 | 60.0000 | 3371 | 59.9985 | 0.0489 |
| 22 | 35.0130 | 63.0000 | 3501 | 62.9931 | 0.2314 |
| 23 | 36.2751 | 66.0000 | 3628 | 66.0118 | -0.3945 |
| 24 | 37.4977 | 69.0000 | 3750 | 69.0057 | -0.1905 |
| 25 | 38.6816 | 72.0000 | 3868 | 71.9960 | 0.1337 |
| 26 | 39.8275 | 75.0000 | 3983 | 75.0067 | -0.2220 |
| 27 | 40.9364 | 78.0000 | 4094 | 78.0098 | -0.3256 |

Figure 10:
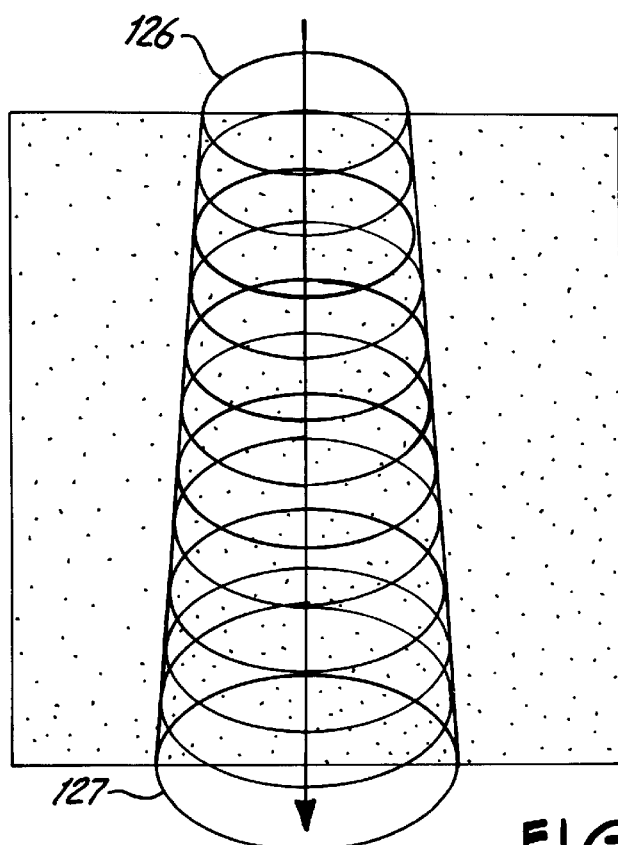
FIG. 10 is a diagram illustrating the increase in beam spot size while maintaining the center location of the beam spots according to an embodiment of the present invention.

The offset scan horn shown in FIG. 8B coupled with precision deflection control system 120 of FIG. 9 makes it possible to locate the center of the beam spot very accurately as indicated in Table 1. The same radial spreading of the linear position of the center of the beam at the outer extremities of the scan traversal range will also cause the beam spot size to be increased in both vertical and horizontal directions. While this radial spreading of the beam spot center can cause exposure error, the increase in the size of the beam spot does not cause error so long as the center location of the beam spot is compensated and linearized according to the method illustrated in FIG. 9 and Table 1. FIG. 10 shows this beam spot size increase in somewhat exaggerated form to illustrate the concept. Since the center of each beam spot position is located at exactly the same linear displacement, the affect of the beam spot size increase is to simply increase the overlap of the exposure. Position 126 has exactly the same center position (and size, in this case) as position 80 of FIG. 7A. Position 127 is located at exactly the same center position as position 82 of FIG. 7A. Since identically the same amount of irradiation exposure is applied to the total area and thickness, the exposure is also identically the same. Thus, consistent dosages can be delivered throughout an entire scan traversal range as a result of the present invention.

In irradiation systems such as have been described above with respect to FIGS. 5 and 6, for example, material must move through flattened tube 16 as it is exposed to radiation from scan horns 20*a* and 20*b*. Since there is pressure inside flattened tube 16, and potentially substantial solid material to be irradiated, flattened tube 16 must be durable enough to withstand the pressure. At the same time, it is necessary for radiation to pass through flattened tube 16 with as little attenuation as possible so that it may effectively irradiate the product passing through. This generally requires that the material through which radiation passes must be very thin. The material used in typical scan horns such as the type shown in FIG. 4 is titanium foil having a thickness of approximately 0.005 inches, which typically serves as a barrier only between the high vacuum conditions inside the scan horn and the atmosphere outside the scan horn. In the case of a material-to-scan horn barrier such as shown in FIGS. 5 and 6, a 0.005 inch foil would potentially be too fragile to maintain high vacuum conditions on one side and pressurized solid material on the other side.

Figure 11:
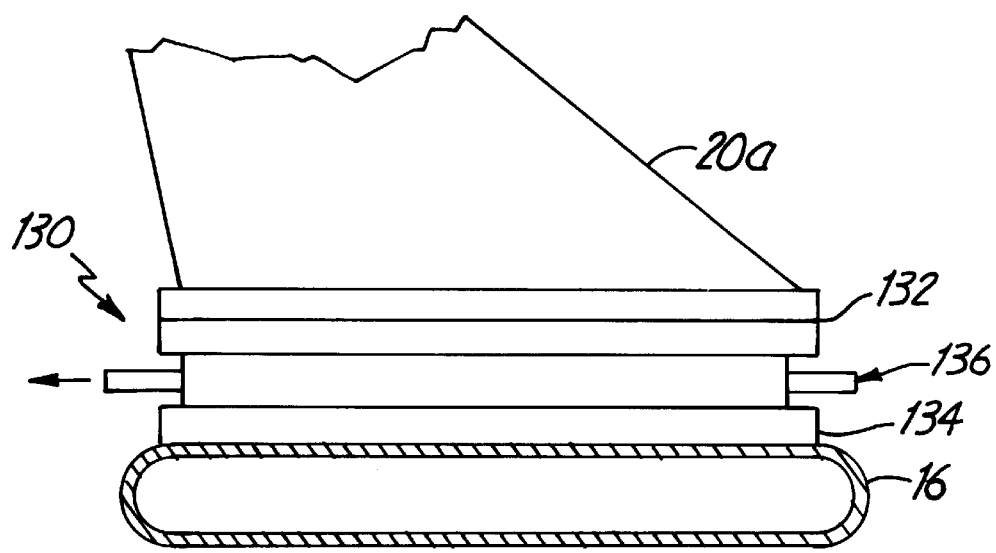
FIG. 11 is a diagram of an exemplary material contact structure capable of providing an effective interface between adjacent scan horn and bulk material tube structures.
Figure 12:
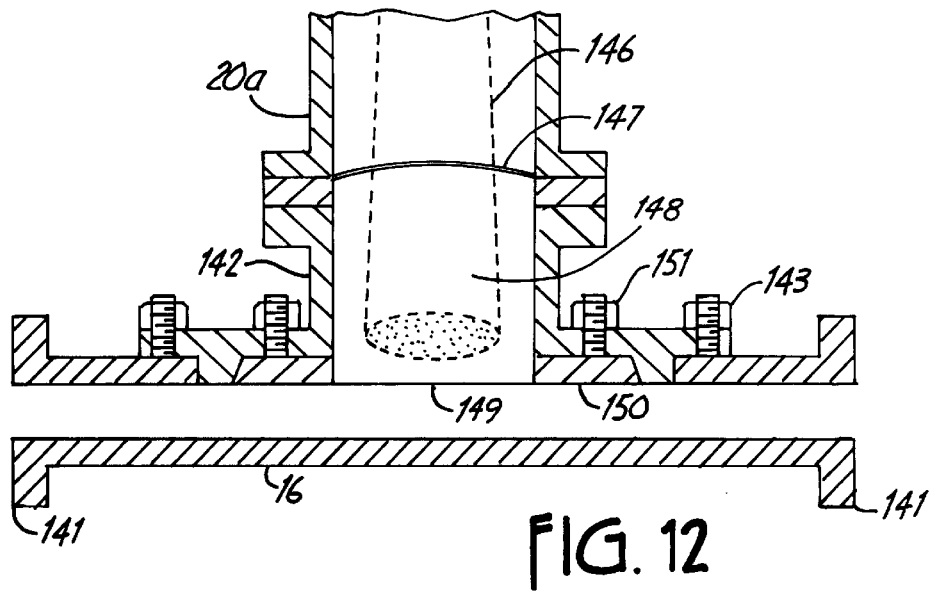
FIG. 12 is a diagram of another exemplary material contact structure capable of providing an effective interface between adjacent scan horn and bulk material tube structures.

FIGS. 11 and 12 are diagrams illustrating material contact structures capable of providing an effective interface between adjacent scan horn and bulk material tube structures. FIGS. 11 and 12 show scan horn-to-material interface structure 130 consisting of a mating adapter that provides isolation between scan horn 20*a* and bulk material tube 16. This isolation barrier performs several functions. First, to minimize beam power attenuation, the interface between the material to be irradiated and the scan horn must be as thin as possible while maintaining sufficient strength to contain the pressurized material in tube 16 without perforation. This interface includes interface 132 between scan horn 20*a* and the mating adapter and interface 134 between the mating adapter and tube 16. A foil material of between 0.020 and 0.040 inches may be used as the irradiation barrier window with beam attenuation proportional to the foil thickness. While this thickness is high by electron beam exit window standards, it is quite thin by material handling standards, and would typically fail quickly in pressurized operation. The mechanical integrity of the foil can be enhanced, however, by supporting the opposite side of the material interface foil with gas flowing in path 136, pressurized to a level similar to the pressure inside bulk material tube 16. This gas may be air or some other selected gas appropriate to this function. The gas pressure may be statically controlled, or there may be a pressure sensor placed inside tube 16 that determines the pressure on the material side of the foil and controls the gas pressure on the opposite side of the foil to maintain zero differential pressure across the foil. Such a pressure management system will minimize flexing of the foil and resulting cracking and failure. The scan horn exit foil may need to be somewhat thicker to withstand the larger pressure differential between vacuum and the pressure typical of the interior the feeder tube.

Both the thin foil that maintains the vacuum barrier for the scan horn and the thicker material contact foil will absorb power and will be heated by the electron beam as the beam passes through. To insure that the foils do not overheat and fail, it is necessary to provide a cooling system. The pressurized gas in the interface structure may be pumped through the interface cavity at a moderately high volume to providing cooling for the foils. The pressurized gas may also be chilled to provide greater heat transfer from the foils to the gas if needed.

A typically preferred material for electron beam exit window foil is titanium due to its high strength and relatively low electron beam attenuation. Titanium is also an acceptable material for food contact, suggesting that bulk material tube 16 may be composed of titanium in an exemplary embodiment. However, in some applications stainless steel may be a preferred material for food contact. Stainless steel has higher beam attenuation and is therefore not as suitable for electron beam transmission. A solution to these conflicting requirements is to construct a food contact foil by laminating a sheet of titanium with a sheet of stainless steel on the food contact side. The stainless steel sheet may be very thin to provide food contact with minimum beam attenuation, while the titanium may make up most of the remaining thickness to maximize strength with minimum attenuation.

FIG. 12 is a diagram illustrating an exemplary construction of the scan horn-to-tube interface according to the present invention. High energy electrons are passed through bulk material flowing through tube 16 via electron beam access window 149, which as mentioned above may be titanium foil, or may alternatively be a lamination of a relatively thin sheet of stainless steel of 0.002 to 0.004 in. thick for conformance with a particular food handling methodology and a relatively thicker sheet of titanium for combined strength with minimum attenuation of the electron beam energy. The foil may be on the order of 0.020 to 0.040 in. thick and is by itself too fragile to withstand the pressure required to force various liquid or formable materials through a tube of as long as ten feet or more. The relatively fragile foil is reinforced by applying pressurized gas on the opposite side of the foil and maintaining the gas at exactly the same pressure as the material inside the tube to hold the forces on the foil in equilibrium, as described above with respect to FIG. 11. The gas pressure applied to the back side of the foil is controlled by measuring the pressure applied to the material inside the tube and providing a feedback control signal to an electronically controlled gas feed valve. Gas may flow in and out at some sustained rate while maintaining the balancing pressure to conduct heat away from the foils that is caused by electron absorption.

Optimum movement of material through the tubular material handling system depends on the path for the material being as smooth and topologically consistent as possible. Ideally, once material such as ground meat is formed to the shape of the flattened tube, this shape should be maintained through the entire process. This is of particular importance in the area of electron exposure foil 149, where the material must be consistent in thickness and velocity to maintain a uniform applied irradiation dosage. An important feature of the structure shown in FIG. 12 is the uniformity of the shape of the inside of tube 16. The benefits of this uniformity are that the pressure required to cause the material to move is minimized, the flow rate of the material across the width of the tube is constant and as will be described in more detail, it is possible to pass a carrier device with exterior dimensions matching the interior dimensions of flattened tube 16 through tube 16 at a rate equal to the material flow rate.

Tube 16 is typically in the shape of a flattened pipe. The structure has flanges 141 at each end for connection to other sections of the material handling system. Mating structure 142 is positioned in an access hole in the side of tube 16 and is held in place by bolts 143. Mating structure 142 is further fastened to scan horn 20*a* which directs electron beam spot 146 in vacuum toward thin metal foil 147 which serves as the interface between the high vacuum required for electron beam acceleration and pressurized volume 148 that supports material contact laminated foil 149. Material contact foil 149 is supported by rigid stainless steel frame 150 that is fastened into place by bolts 151 and secured to mating structure 142. Material contact foil 149 should be quite thin to allow for efficient transmission of electrons through the material, but it must also be capable of sustaining the pressure and potential deformation that will result from contact with liquid or solid materials. With pressurized gas in region 148 maintained on the back side of material contact foil 149, the stress applied to material contact foil 149 is greatly reduced.

To allow for smooth movement of material through the electron exposure structure, material contact foil 149 and its carrier must be designed and fabricated to fit mating structure 142 precisely with no gaps or crevices that might allow for food material to become lodged within. Carrier frame 150 may be fabricated of relatively rigid stainless steel material with dimensions that mate precisely to the surfaces of mating structure 142. Foil 149 may be bonded to stainless steel carrier frame 150 by welding for maximum strength and mechanical integrity. Bolts 151 and nuts 143 may be fabricated as studs bonded to carrier frame 150 and tube 16, respectively.

A basic requirement of irradiation systems in general and food irradiation systems in particular is establishment and calibration of the irradiation dose that is applied to materials. Prior art irradiation systems typically apply radiation to products that have been processed and packaged as individual items of some type. Verification of the dosimetry for such prior art systems typically involves positioning a number of dosimeters at various places on and within the products to be irradiated, and measuring the dose applied to those dosimeters by processing. This verification is required by government regulatory agencies to insure compliance with the established processing guidelines. It is further required that the dosimetry verification be traceable to a calibrated standard maintained by a government standard such as the National Institute for Standards and Technology (NIST).

The dose applied to bulk material pumped through an exposure tube may be varied and controlled by several means. Material pumps are relatively precise in their ability to maintain pressure and volume, and may be controlled by an electronic system to supply material through the tube at a relatively constant rate. A more precise method is to utilize a reasonably well controlled pump rate coupled with a precision material velocity measurement system that determines the actual rate that material is moving through the tube and slaves the irradiation exposure control system to this actual flow rate. This method is particularly useful for maintaining accurate applied dose while the system is starting or stopping whereby the flow rate of the material is reaching the desired target speed or slowing down to a stop.

While pump assembly 14 is shown as an exemplary device for pressurizing bulk material tube 16 to force bulk material to flow through tube 16, it should be understood that other mechanisms may be used to cause bulk material to flow through tube 16. For example, the irradiation system may be constructed in such a manner that gravity is effective to cause bulk material to flow "downhill" through tube 16. Other modified pressurization assemblies will be apparent to those skilled in the art.

Calibration and verification of dosimetry for bulk material irradiation systems such as the type described herein must employ different methodology than prior art systems since there are no individual items that dosimeters may be placed upon or within. In either type of system, dosimeters are placed at the appropriate locations within the material being irradiated so that exposure can be verified. For bulk material irradiation, the dosimeters must be introduced into the material stream, positioned at the appropriate locations in the material stream and retrieved for verification measurement.

Figure 13:
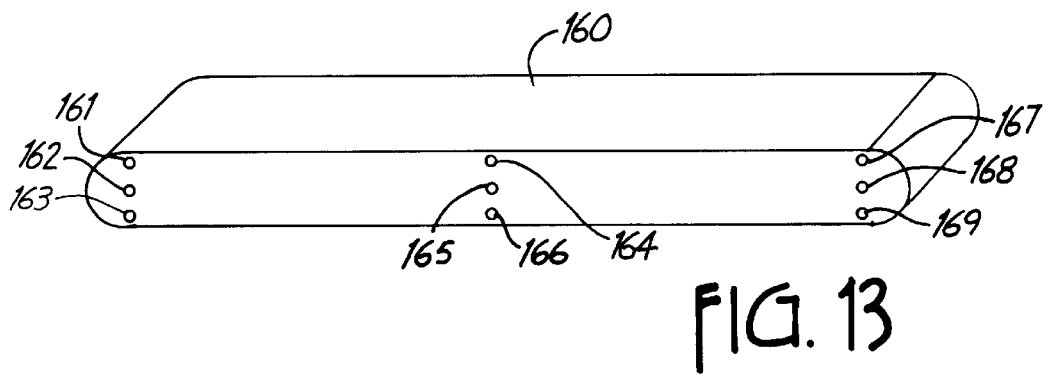
FIG. 13 is a diagram illustrating an exemplary dosimetry carrier for insertion into the material flow path according to the present invention.

FIG. 13 is a diagram illustrating an exemplary dosimetry carrier 160 for insertion into the material flow path according to the present invention. Dosimetry carrier 160 is formed from a flexible solid plastic material suitable for food contact. The dimensions of carrier 160 are selected to fit snugly within the interior cross section of tube 16 so that with either liquid or solid material, carrier 160 will be driven through tube 16 by the flow of the material. Ordinary alanine chemical dosimeters of either pellet or strip form may be placed in prepared locations 161–169 or other locations of interest for dose mapping of the irradiation exposure across bulk material tube 16. Carrier 160 holds each dosimeter at an exact vertical and horizontal position and carrier 160 is inserted into the material stream to be moved at exactly the same speed as the material that is pumped through tube 16 for irradiation exposure. As was discussed in the description of the electron exposure structure, it is important that the shape of the interior cross section of tube 16 be constant from entry to exit of the system so that the pressure required to force material through tube 16 is minimized and dosimetry carrier 160 will not be impeded in its travel through the system.

Figure 14:
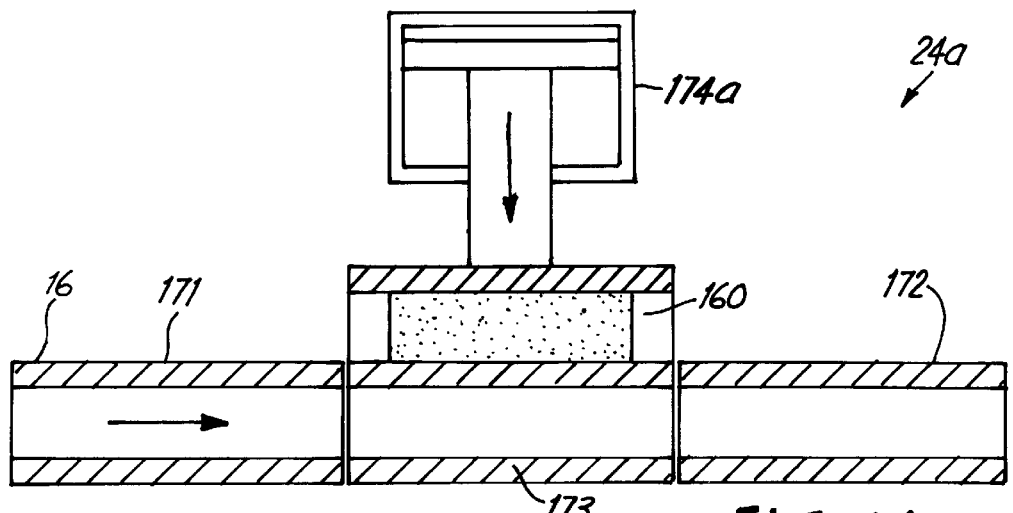
FIG. 14 is a diagram illustrating an exemplary dosimetry carrier input access port according to the present invention.

Dosimetry carrier 160 must be inserted into the material stream, exposed by the irradiation system, and retrieved from the material stream to measure the dosimetric accuracy of the system. Carrier 160 may be inserted into the material stream by the use of input access port 24a as shown schematically in FIG. 14. Access port 24a includes input tube 171, output tube 172 and carrying module 173. In the normal mode, module 173 is in the upper position whereby material flow passes through input tube 171 through the lower port of module 173 and out through output tube 172. In this mode, the upper channel of module 173 is open and freely accessible to insert dosimetry carrier 160 into the channel. Once dosimetry carrier 160 is in place in the module channel, module 173 maybe quickly moved from its upper to its lower position by a sufficiently powerful linear actuator such as pneumatic cylinder 174a to cause carrier 160 to be placed in line with the material flow. This movement of the module 173 may be accomplished while the pumping system is operational with a minimal amount of spillage of material, or the pump may be stopped and restarted after dosimetry carrier 160 is inserted and positioned into the material flow path.

Figure 15:
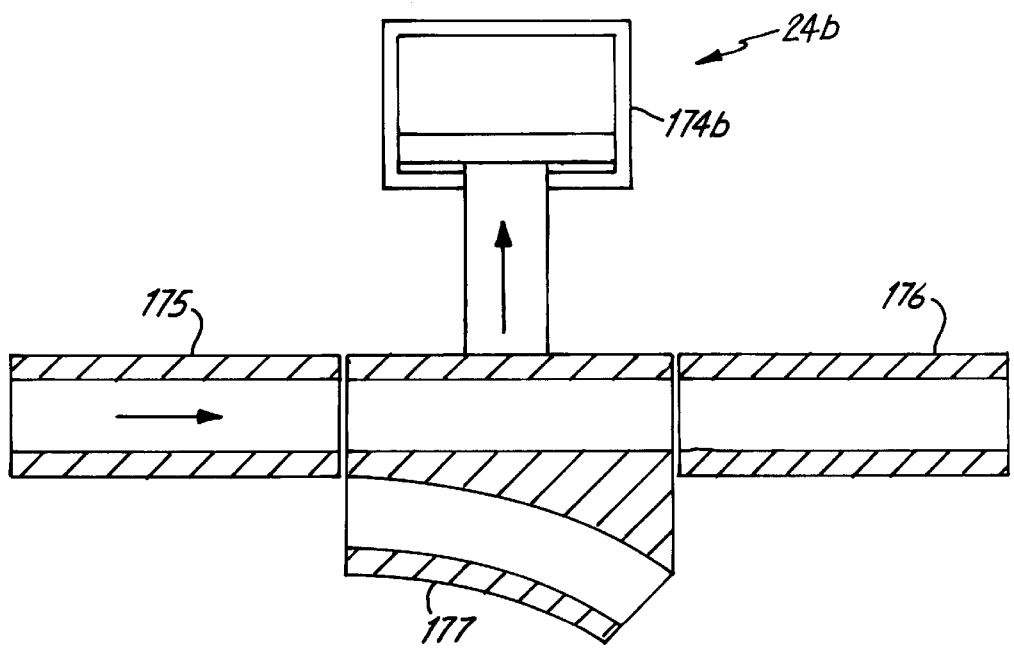
FIG. 15 is a diagram illustrating an exemplary dosimetry carrier exit port according to the present invention.

Retrieval of dosimetry carrier 160 may be accomplished by using extraction port 24b shown in FIG. 15. Extraction port 24b has a structure similar to input access port 24a. Extraction port 24b is also a slide structure that is moved quickly by a similar linear actuator such as a pneumatic cylinder 174b. The normal material flow position is with the actuator in the lower position so that the material movement channel is routed from the irradiation module through port entrance 175 to port exit 176. When the actuator is lifted to its upper position, the slide is moved up and the path from the irradiation module through port entrance 175 is routed through waste gate port 177. When dosimetry carrier 160 has been passed through the irradiation module, it must be retrieved to measure the alanine dosimeters for dosage measurement. Carrier 160 is ejected from the material stream by examining material flow measurements which accurately determine the location of the carrier and control the movement of waste gate port 177 to minimize the amount of material that is ejected with carrier 160. A further utility of the waste gate structure is a fail safe mechanism to route material out of the processed material path in the event of some type of serious system malfunction which would result in unexposed material passing through the system.

Waste gate 177 provides a seal against the processed material flow past the gate so that cleanout can be accomplished without completely purging the processed material from port exit 906 and the associated downstream material handling path.

As described earlier, it is important that the exposure applied to material to be irradiated be carefully calibrated and controlled to meet the requirements of the regulatory agencies as well as maintaining acceptable product quality. The bulk tube fed system as described must manage irradiation dosage by applying the electron beam exposure to bulk material as it flows through a flattened tube structure. Since the rate of flow of material through the tube is dependent upon pressure created by a pump, the flow rate is not as constant as a material conveyor of typical prior art systems. This somewhat variable material flow rate is accommodated by the use of a material flow rate sensor that is placed in the material input structure after the output of the input access port 172. After the material has been formed to the flattened tubular shape of the cross section of the exposure window structure, the flow rate is consistent across the width of the material. The exposure of the electron beam irradiation system is coupled by computer control to the material flow rate sensor so that the dosage is controlled in closed loop fashion as the material moves, no matter what its speed, up to the maximum flow rate.

Since the material to be irradiated is handled in bulk form with this system, it is important to insure that the irradiation dosage is reliably applied to all of the material that passes through the system so that no possible unprocessed material is mistakenly passed through the system and assumed to be safe when it is not. One possible scenario that must be mitigated is power failure that causes the accelerator to momentarily pause generation of the electron beam, while material might continue to flow through the system. This condition may be managed in one of several ways. The first and preferred method is to power the irradiation system through an uninterruptible power supply with as little as 30 seconds of power backup time. If main power is temporarily lost, this is sufficient time to stop the material flow pump and hold the material stationary under the scan horns. If the power interruption is temporary, the accelerator may be restored and the pump may be restarted. Since the accelerator exposure is slaved to the material flow rate, the material will receive a carefully controlled dosage even while it is starting from a stationary condition.

The second and more drastic condition is an extended power outage, in which case the system will be stopped for a longer period of time, in which case the typical daily clean out and wash down procedure must be performed. As a fail safe procedure, if some type of serious system failure is detected, the output waste gate can immediately gate product of unknown status out of the processed product flow to insure that there is no mixing of processed and unprocessed product.

Figure 16:
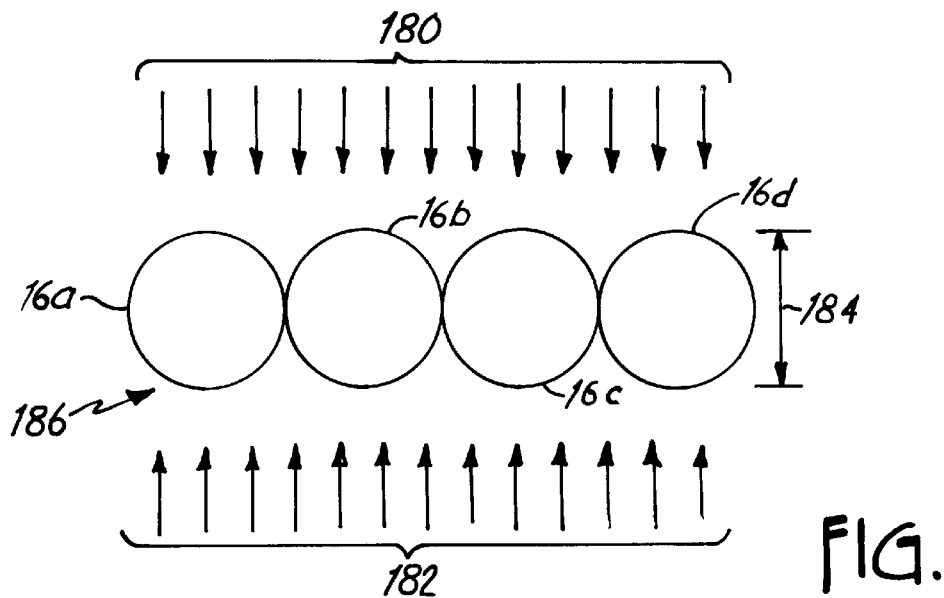
FIG. 16 is a diagram illustrating a configuration for two-sided irradiation of a plurality of cylindrical tubes in a side-by-side arrangement.

As has been discussed above, two-sided irradiation exposure is typically both more efficient and provides more consistent exposure than single sided exposure, and will be assumed to be the radiation source employed for the following description of the present invention. Bulk material may be exposed to the two-sided irradiation source using an exposure system as shown schematically in FIG. 16. Bulk product may be moved through one or more cylindrical tubes 16a–16d in a side-by-side arrangement 186, each having a diameter 184 small enough so that the depth-dose curve of FIG. 2 generally governs the exposure. Although FIG. 2 illustrates the two-sided depth-dose curve for 1.8 MeV electrons which results in a maximum exposure depth of 1.5 cm (or 0.6 inches), the maximum irradiation energy allowed by USDA and FDA rules is 10 MeV which results in a maximum exposure depth of 8.9 cm (or 3.5 inches). The depth-dose curve for 10 MeV electrons has the same general shape as depth-dose curve 40 shown in FIG. 2. Cylindrical tubes 16a–16d serve to contain bulk material such as liquids or solids that may be pumped through a pipe, such as ground beef. For ionizing radiation from upper electron beam 180 and lower electron beam 182 to pass through tubes 16a–16d, they must be constructed of material that is relatively transparent to such radiation yet is sufficiently strong to contain the material within under pressure. The preferred material for such applications is titanium which exhibits both of these characteristics. Titanium has better radiation propagation characteristics than other materials, but absorption losses will still occur and must be minimized. An exemplary thickness for the titanium tubing in the radiation exposure region is on the order of 0.010 to 0.020 inches, which is quite thin by normal material handling structure standards. This unusually thin structure is only required of the exposure portion of the structure, which may be coupled to an ordinary material handling tube of more typical wall thickness of 0.100 to 0.250 inches. Cylindrical tubes 16a–16d are one preferred shape for containment of bulk material under pressure, since the tube walls will be subjected primarily to tensile stress. Elliptical tubes may also be employed in another embodiment, for example.

Figure 17:
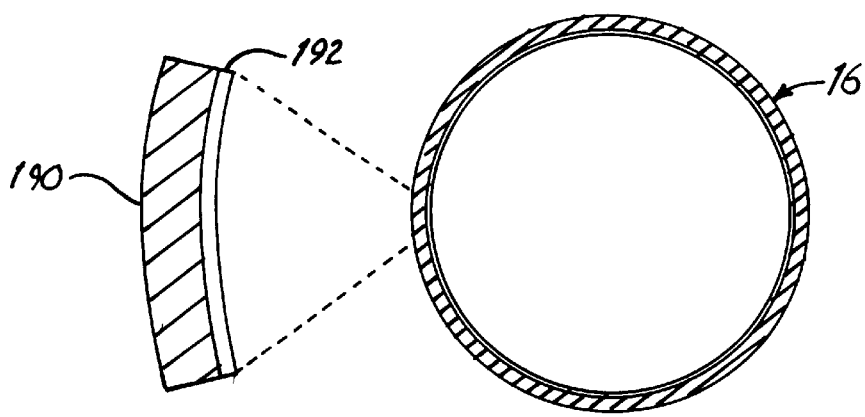
FIG. 17 is a diagram illustrating an exemplary laminated tubular material exposure structure.

Titanium is preferred for radiation propagation through the barrier metal, and may also be used for food contact, but may not be a preferred material for food contact in some applications. Other materials such as ceramics and certain metals may be preferred for some food contact applications. Stainless steel is a possible food contact material, however stainless steel is not a good material for propagating radiation. FIG. 17 illustrates an exemplary tubular material exposure structure 16 that comprises a lamination of a thin layer of stainless steel 192 on the interior for food contact bonded to an outer layer of titanium metal 190 which provides the majority of the strength and physical structure of the tube. The inner stainless steel layer 192 may be 0.001 to 0.003 inches thick, while the outer titanium layer 190 may be 0.008 to 0.019 inches thick depending on the internal pressure that must be sustained. The lamination may be constructed by plating a layer of stainless steel 192 or other food contact metal on the interior of a thin seamless titanium tube 190.

Figure 18:
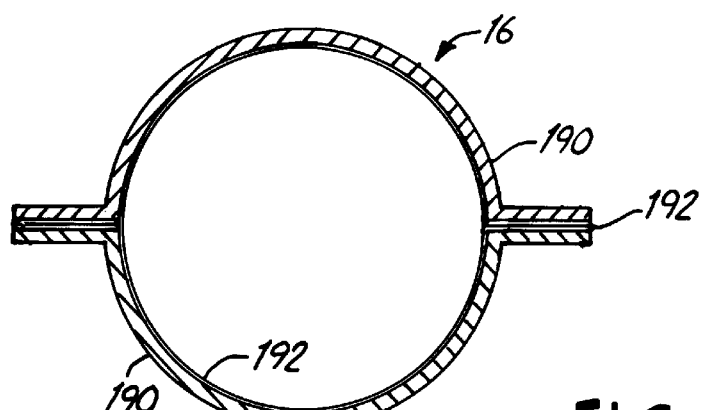
FIG. 18 is a diagram of another exemplary laminated tubular material exposure structure.

An alternate tube construction method is to form tube 16 from flat laminated sheets into circular sections that may be soldered, welded or clamped together to form a cylindrical tube shape 16 as shown in FIG. 18. For example, a flat laminated sheet may include a thin layer of stainless steel 192 and a thicker layer of titanium metal 192. Two such sheets facing each other maybe shaped and soldered, welded or clamped together to form tube 16.

Figure 19:
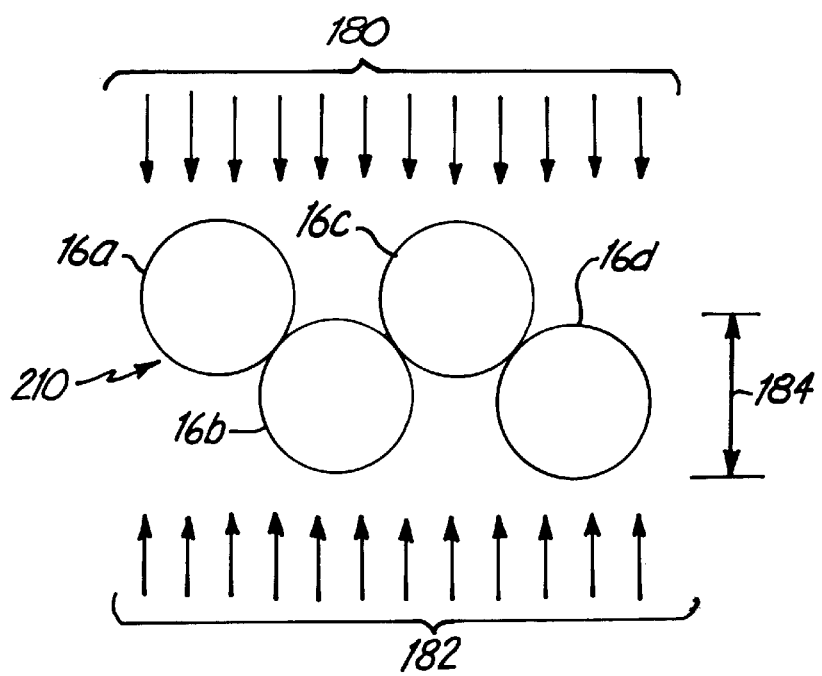
FIG. 19 is a diagram illustrating a configuration for two-sided irradiation of a plurality of cylindrical tubes in an alternating offset arrangement.

FIG. 19 is a diagram of another exemplary embodiment of the configuration of bulk material tubes 16a–16d according to the present invention. Tubes 16a–16d are configured in an offset arrangement 210 to recover a portion of the irradiation beam power from upper electron beam 180 and lower electron beam 182 that completely penetrates through the thinner cross sections at the edges of the tubes. With this configuration, the total beam scan distance may be reduced and wasted beam power will be minimized.

Multiple tubes 16a–16d are positioned adjacent to each other and located adjacent to the scan horn pairs to allow irradiation of multiple simultaneous product streams that are physically separated from each other. The irradiation control system may be controlled separately so that each tube receives an independently set exposure level depending on the physical location of the tube. A closed loop sensor device may be placed below the tube opposite the scan horn to measure the dose that is applied and adjust accordingly to maintain the minimum dosage at the locations where the thickness is lower.

The thin tubular exposure structure maybe connected to an ordinary thick wall stainless steel food contact pipe for connection to the exterior of the irradiation system. The diameter 184 of the all of the tubular pipes 16a–16d should preferably be constant to minimize material flow restriction and pressure increase and to facilitate the movement of a dosimetry calibration shuttle through the tube. A specialized food material pump (e.g., pump assembly 14, FIG. 1A) is used to develop pressure to cause the material to flow through the material handling tubes. Such pumps are typically constructed of stainless steel and are specially designed to pump liquids and formable solids such as ground beef without damaging the food material. Versions of these food material pumps are available with vacuum pumps that remove up to 99% of the atmospheric air surrounding materials such as ground beef before the material is pressurized and directed out of the pump and into the output tube. The oxygen content in the remaining 1% atmospheric air may be further reduced by filling the input hopper structure of the pump with nitrogen or carbon dioxide gas. This process displaces oxygen from the atmospheric air to be subsequently removed by the vacuum pump. The described pump system coupled to the material handling tubes of the present invention serves to exclude virtually all of the oxygen from materials such as ground beef as a process step in the irradiation of fresh ground beef. The removal of oxygen from the irradiation environment significantly improves the quality of irradiated fresh meat such as ground beef by preventing lipid oxidation.

Figure 20:
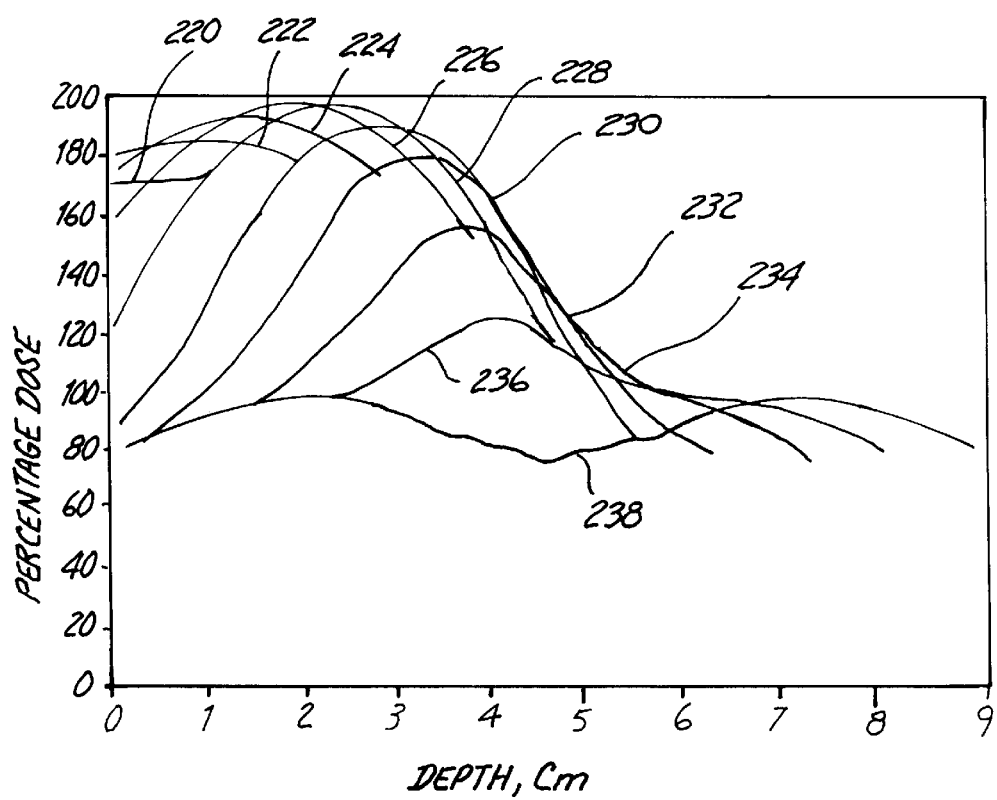
FIG. 20 is a graph illustrating depth-dose curves for varying thicknesses of material.

While the cylindrical shape is preferred for physical strength and structure, it is problematic for irradiation dose exposure management due to the phenomenon illustrated in FIG. 20, which is a graph of depth-dose curves for varying thicknesses of material. At the full thickness of the cylinder, the depth-dose curve of FIG. 2 prevails and good, consistent exposure results. This depth-dose curve is shown as curve 238 of FIG. 20. As the exposure point is moved toward the edge of the cylinder and the effective thickness diminishes, the depth-dose curves at the left region of FIG. 20 begin to be observed, and the dosage consistency is reduced to the point of being unacceptable. Curve 220 illustrates the depth-dose relationship at a thickness of 0.8 cm, curve 222 illustrates the depth-dose relationship at a thickness of 1.8 cm, curve 224 illustrates the depth-dose relationship at a thickness of 2.6 cm, curve 226 illustrates the depth-dose relationship at a thickness of 3.6 cm, curve 228 illustrates the depth-dose relationship at a thickness of 4.4 cm, curve 230 illustrates the depth-dose relationship at a thickness of 5.4 cm, curve 232 illustrates the depth-dose relationship at a thickness of 6.2 cm, curve 234 illustrates the depth-dose relationship at a thickness of 7.2 cm, curve 236 illustrates the depth-dose relationship at a thickness of 8.2 cm, and curve 238 illustrates the depth-dose relationship at the full thickness of 9.0 cm It may be noted that an elliptical shaped tube improves the amount of the total cross section that is near the preferred full thickness, but there is still an amount of material that is near the edges of the elliptical cross section that receives the excessive dose as illustrated in FIG. 20.

This dilemma may be solved by utilizing an exposure compensated tube construction in accordance with the present invention. The typical objective of material handling components in irradiation systems is to be as efficient as possible. In particular, it is expected that the material handling components will have minimal interference with or attenuation of the electron beam. The exposure compensated tube construction of the present invention is quite different from this typical methodology, in that a material handling tube structure is designed to attenuate the electron beam according to a predetermined criterion. In particular, the criterion is for the total beam absorption to be equivalent to that caused by a constant thickness sheet of ground beef. The total absorption will be a combination of the absorption due to ground beef summed with the absorption of a relatively thick cross section of tubing of titanium or some other suitable material. With such an exposure compensated tube, the thickness of the tubing increases as the thickness of the material contained within it decreases. For material such as titanium, the absorption of 10 MeV electrons is approximately 300% greater than ground beef, so an amount of titanium ⅓ as thick as the equivalent ground beef thickness will absorb an equal amount of beam power. The shape of the outer surface of the tube is determined by forming a tube material thickness at each point across the width of the tube corresponding to an absorption equal to the difference between the maximum thickness and the actual ground beef thickness at that point. The effect is to create a composite absorption structure that has a constant absorption corresponding to material of constant uniform thickness.

Figure 21:
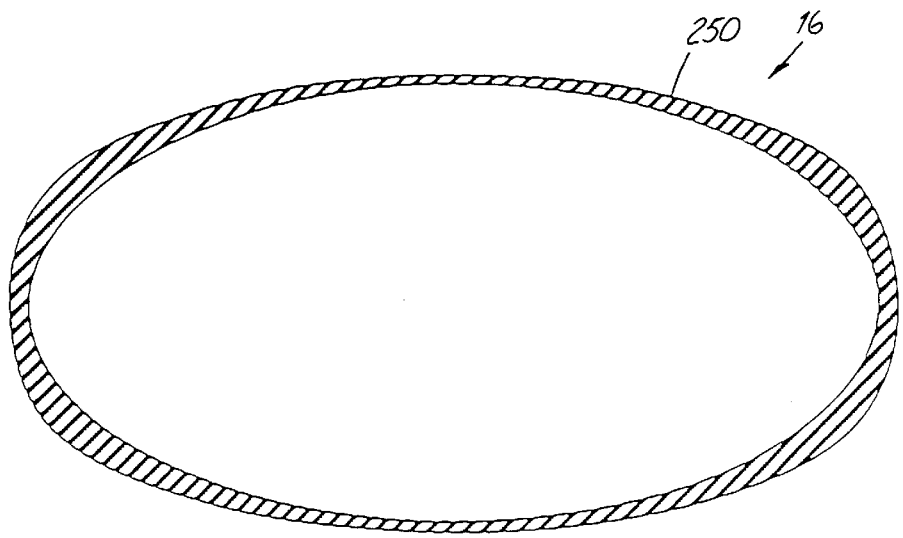
FIG. 21 is a diagram showing a bulk material tube having an exposure compensated geometry.

FIG. 21 is a diagram showing bulk material tube 16 having an exposure compensated geometry. The interior shape may be any smooth profile, although an elliptical shape is generally preferred. The thicknesses of tube wall 250 at the edges are chosen for structural integrity, particularly at the top and bottom where beam absorption limits the maximum material thickness that may be processed. At the left and right edges, most of the beam power will be absorbed by the material of tube wall 250. It will typically be necessary to provide air or liquid cooling to the tube in these areas to minimize heat buildup. If liquid cooling is employed, the absorption of the liquid should be accounted for in the total absorption profile at the edge of the tube.

The modified tube cross section profile shown in FIG. 21 is used to compensate for the reduced material thickness at the edges of the tube. According to an exemplary embodiment, the tube may be constructed of solid titanium material that is generally recognized as safe for food contact to directly contain bulk material such as ground beef that maybe forced through the tube by pumping under pressure. The increasingly thick cross section of the tube at the edges will absorb a substantial amount of the electron beam power to the point that at the outer extremity of the tube, all of the electron beam power will be absorbed by the tube. An approximation of the amount of power that will be absorbed by the tube may be made by comparing the absorption that would occur if the material being processed were rectangular and subtracting the cross section area of the elliptical shape of the material. The result is $$\pi r^2/(2r)^2 = \pi/4 = 0.785 \qquad (\text{Eq. 1})$$

indicating that 78.5% of the power will be absorbed by the material being processed, while 21.5% will be absorbed by the compensating tube structure. A typical industrial irradiation system with a total beam power of 10,000 watts would cause 2,150 watts of power to be absorbed in the compensating tube structure. The 7,850 watts of power absorbed by the material being processed does not result in substantial product heating due to the fact that the power is applied to product that is moving quickly through the exposure module. The 2,150 watts absorbed by the tube structure, however, is persistently applied to the same area, so a significant amount of heating will occur. If this heat is not removed continuously, the temperature of the exposure module will rise to the point that the product contained within could be damaged.

Figure 22:
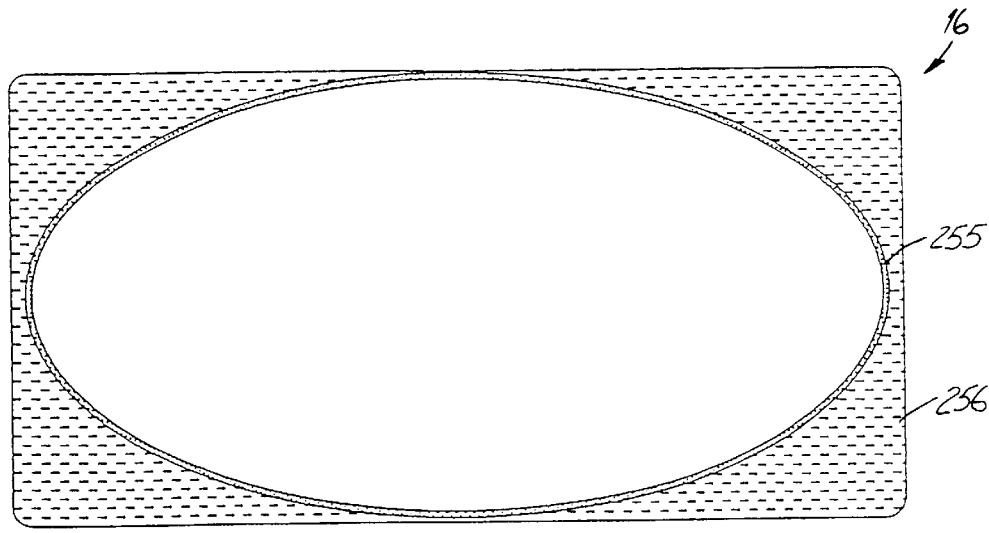
FIG. 22 is a diagram of another embodiment of an exposure compensated bulk material tube.

FIG. 22 is a diagram of an alternate embodiment of an exposure compensated bulk material tube 16. The interior cross section of tube 16 is still formed in an elliptical shape, however, the outer shape of tube 16 is generally rectangular. The cross section between outside wall 255 of the elliptical shape and the exterior rectangular shape is filled with water 256 that is pumped through this area in a continuous flow to accomplish two beneficial results. First, the water has the same basic irradiation absorption characteristic as meat or other products that may be processed by irradiation, so forming a constant thickness of either the water or product results in an equivalent compensation effect. The net effect is that the product and the water receive the same exposure profile as the center portion of the product. Second, the water can remove heat from tube 16. Various types of product such as ground beef that may be moved through tube 16 by pumping are more effectively moved if the temperature of tube 16 is controlled at a preferred level.

Walls 255 of the elliptical portion of tube 16 may constructed of thin titanium material to minimize the absorption of radiation as it is delivered to the product being processed. Titanium is a rather poor conductor of heat, so being surrounded by temperature controlled water is a preferred geometry for titanium tube 16.

Certain applications for bulk material irradiation systems may require the pressure in the interior of tube 16 to be quite high. For example, it may be desired for the irradiation system to feed directly into a product packaging system that presents a significant amount of back pressure to the system. Various types of pumps are known in the art that are capable of maintaining pressures of 300 pounds per square inch (psi) or more. This pressure is sufficiently high that tube 16 must be designed to sustain such pressure continuously or a serious system failure might occur.

Figure 23:
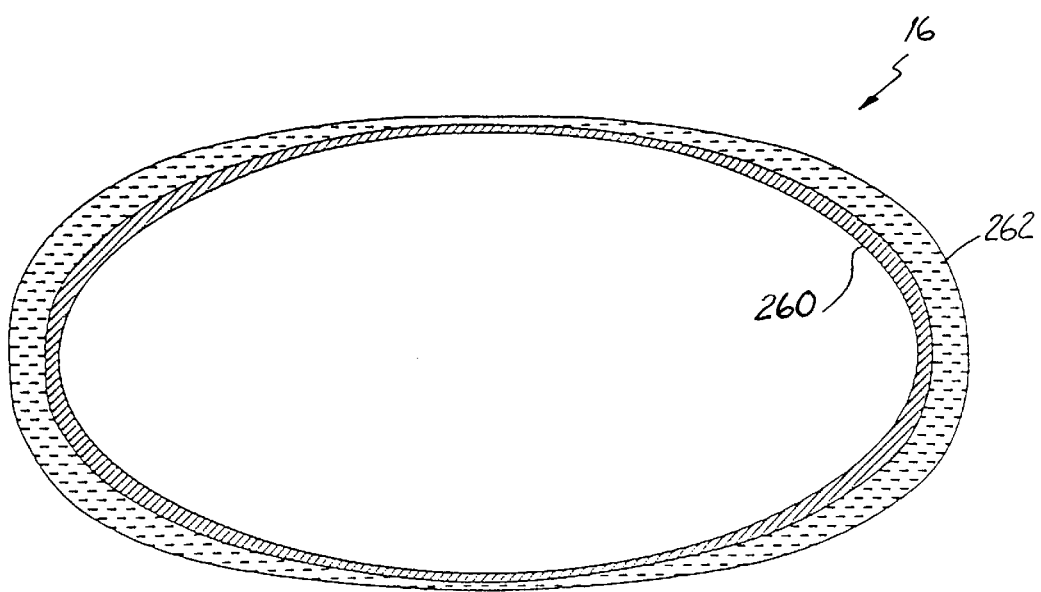
FIG. 23 is a diagram of an exposure compensated bulk material tube having a structure that is a combination of the structures of FIGS. 21 and 22.

FIG. 23 is a diagram of tube 16 having a structure that is a combination of the structures of FIGS. 21 and 22. Wall 260 of the internal tube is constructed of solid titanium that is partially compensated by forming an increased wall thickness at the outer edges of the tube and is generally more structurally rigid than the thin walled tube of FIG. 22. The outer tube that contains cooling water 262 is generally elliptical in shape and surrounds the inner tube with a greater thickness of water 262 in the outer edges to efficiently remove heat and to provide the exposure compensation needed to maintain the equivalent absorption characteristic of constant thickness material. Water 262 contained between the outer cooling and compensation tube and the inner exposure and material containment tube may be pressurized by the use of a high pressure water pump and a pressure regulator/flow control valve. The inner material containment tube may have sufficient structural strength and integrity to maintain some moderate amount of pressure by itself, and with the pressure applied on the exterior surface of wall 260, the pressure contained within is the sum of the water pressure and the pressure containment capacity of the inner tube. The net effect is that the pressure that may be sustained by the inner exposure and material containment tube may be increased substantially while still providing the necessary cooling and exposure compensation.

Maintenance of the spacing between the two tube structures maybe accomplished by the use of small spacer buttons (not shown) constructed of titanium or some other relatively low radiation absorption materials. These spacers maybe small rod or pin-like structures welded into place to provide some structural strength enhancement, or they may be simply pressed or wedged into place to insure that they remain in the proper location. Alternately, the spacing structures may be welded to the interior tube to hold them in place before the outer tube is slipped over the inner tube assembly. Flange structures may be welded to each end of the interior and exterior tubes with water ports to provide the path for the cooling water to enter and exit.

The present invention is a bulk material irradiation system having multiple features for effectively and efficiently providing consistent and controllable irradiation dosage to a flowable bulk material such as ground beef. For example, a material handling system, double-sided irradiation exposure system, linear electron beam locating system, exposure module system, dosimetry carrier system, and exposure compensation system are disclosed in conjunction with the bulk material irradiation system of the invention. The many aspects of the present invention improve the ability to effectively irradiate bulk materials, which enables the expansion of product types that may desirably be irradiated for increased safety.

Although the present invention has been described with reference to preferred embodiments, workers skilled in the art will recognize that changes may be made in form and detail without departing from the spirit and scope of the invention.

What is claimed is:

1. A bulk material irradiation system comprising:
   an input for inserting bulk material;
   a bulk material tube connected to the input and forming a path for bulk material flow;
   a pressurizing assembly connected to the bulk material tube for forcing the bulk material to flow through the bulk material tube, the pressurizing assembly comprising a pump assembly operable to remove oxygen from the bulk material flowing through the bulk material tube;
   an irradiation assembly providing ionizing radiation that penetrates a full thickness of the bulk material to irradiate the bulk material passing adjacent to the irradiation assembly in the bulk material tube; and
   an output for irradiated bulk material to exit the bulk material tube.

2. The bulk material irradiation system of claim 1, wherein the irradiation assembly is operable to provide ionizing radiation to irradiate the bulk material passing adjacent to the irradiation assembly in the bulk material tube from two opposite sides.

3. The bulk material irradiation system of claim 2, wherein the irradiation assembly comprises:
   an electron accelerator producing an electron beam in a path defining an axis;
   a magnet assembly for deflecting and scanning the electron beam across the bulk material in the bulk material tube from a first side and from a second opposite side;
   a first scan horn offset from the axis defined by the electron beam, the first scan horn providing a medium for propagation of the electron beam from the magnet assembly to the bulk material tube on the first side of the bulk material in the bulk material tube; and
   a second scan horn offset from the axis defined by the electron beam, the second scan horn providing a medium for propagation of the electron beam from the magnet assembly to the bulk material tube on the second side of the bulk material in the bulk material tube.

4. The bulk material irradiation system of claim 3, further comprising:
   a control system for operating the magnet assembly to evenly space successive scan steps of the electron beam on the bulk material in the bulk material tube.

5. The bulk material irradiation system of claim 1, wherein the irradiation assembly comprises:
  an electron accelerator producing an electron beam, the electron beam comprising a plurality of successive electron pulses; and
  a power controller for selectively adjusting a power level of each of the successive electron pulses of the electron beam produced by the electron accelerator.

6. The bulk material irradiation system of claim 1, wherein the irradiation assembly includes a sensor for measuring a level of ionizing radiation delivered to the bulk material.

7. The bulk material irradiation system of claim 6, wherein the irradiation assembly comprises:
  an electron accelerator producing an electron beam, the electron beam comprising a plurality of successive electron pulses; and
  a power controller for selectively adjusting a power level of each of the successive electron pulses of the electron beam produced by the electron accelerator based on the level of ionizing radiation measured by the sensor to control a dosage of ionizing radiation delivered to the bulk material.

8. The bulk material irradiation system of claim 1, wherein the irradiation assembly comprises:
  a source of ionizing radiation;
  a conduit for providing a radiation propagation path between the source of ionizing radiation and the bulk material tube;
  a foil between the conduit and the bulk material in the bulk material tube; and
  a gas flow path adjacent to the foil opposite the bulk material tube for receiving a flow of gas pressurized to a level approximately equal to a level of pressurization in the bulk material tube.

9. The bulk material irradiation system of claim 8, further comprising:
  a sensor for measuring the level of pressurization in the bulk material tube; and
  a gas flow adjustment mechanism for adjusting the pressurization of the gas flow in the gas flow path to maintain the level of pressurization o the gas flow path approximately equal to the level of pressurization in the bulk material tube.

10. The bulk material irradiation system of claim 8, further comprising:
  a carrier frame rigidly attached to the bulk material tube, the foil being bonded to the carrier frame.

11. The bulk material irradiation system of claim 1, wherein the at least one bulk material tube comprises a plurality of bulk material tubes each offset from adjacent tubes in an alternating pattern.

12. The bulk material irradiation system of claim 1, wherein the bulk material tube is composed of titanium and a laminate layer for contacting bulk material on an inner surface of the bulk material tube.

13. The bulk material irradiation system of claim 12, wherein the laminate layer is composed of stainless steel.

14. The bulk material irradiation system of claim 1, further comprising:
  a dosimetry carrier entry port in the bulk material tube upstream from the irradiation module; and
  a dosimetry carrier exit port in the bulk material tube downstream from the irradiation module.

15. The bulk material irradiation system of claim 14, wherein the dosimetry carrier entry port and the dosimetry carrier exit port are configured to receive a dosimetry carrier having a shape conforming to an inner circumference of the bulk material tube.

16. The bulk material irradiation system of claim 14, wherein the dosimetry carrier exit port is movable between a first position for allowing bulk material to pass through the bulk material tube and a second position for diverting a flow of bulk material away from the bulk material tube into a waste area.

17. The bulk material irradiation system of claim 1, wherein the bulk material tube is elliptical in shape and has a wall with a thickness that is thicker around edge portions of the bulk material tube than around a central portion of the bulk material tube.

18. The bulk material irradiation system of claim 1, further comprising a liquid around the wall of the bulk material tube.

19. The bulk material irradiation system of claim 1, wherein the bulk material tube has an outer wall that is rectangular in shape and an inner wall that is elliptical in shape, a region between the outer wall and the inner wall including a liquid with an irradiation absorption characteristic that approximately matches an irradiation absorption characteristic of the bulk material in the bulk material tube.

20. The bulk material irradiation system of claim 1, wherein the bulk material is ground beef.

21. The bulk material irradiation system of claim 1, wherein the bulk material fills substantially all of a volume of the bulk material tube.

22. The bulk material irradiation system of claim 1, wherein the bulk material tube is configured so that there is no straight line path for radiation to exit the irradiation assembly through the input or the output.

* * * * *

UNITED STATES PATENT AND TRADEMARK OFFICE
CERTIFICATE OF CORRECTION

PATENT NO.     : 6,653,641 B2
DATED          : November 25, 2003
INVENTOR(S)    : Stan V. Lyons et al.

It is certified that error appears in the above-identified patent and that said Letters Patent is hereby corrected as shown below:

Column 18,
Line 54, delete "maybe", insert -- may be --

Column 19,
Line 9, delete "maybe", insert -- may be --

Column 20,
Line 48, delete "maybe", insert -- may be --

Column 21,
Lines 65 and 67, delete "maybe", insert -- may be --

Signed and Sealed this

Fourteenth Day of September, 2004

JON W. DUDAS
*Director of the United States Patent and Trademark Office*